(12) United States Patent
Lohse et al.

(10) Patent No.: US 7,687,580 B2
(45) Date of Patent: Mar. 30, 2010

(54) SYNTHESIS AND USE OF WELL-DEFINED, HIGHLY-BRANCHED SATURATED HYDROCARBON POLYMERS

(75) Inventors: David J. Lohse, Bridgewater, NJ (US); César Garcia-Franco, Houston, TX (US); Nikos Hadjichristidis, Athens (GR)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1088 days.

(21) Appl. No.: 11/296,999

(22) Filed: Dec. 8, 2005

(65) Prior Publication Data

US 2007/0135583 A1    Jun. 14, 2007

(51) Int. Cl.
*C08F 10/00*   (2006.01)
*C08F 36/08*   (2006.01)
*C08F 8/42*    (2006.01)
*C08F 36/04*   (2006.01)

(52) U.S. Cl. ................. 525/333.7; 525/333.1; 525/338; 521/148

(58) Field of Classification Search ............... 525/333.7, 525/314; 526/347, 392, 392.2, 346; 521/148
See application file for complete search history.

(56) References Cited

FOREIGN PATENT DOCUMENTS

JP          06-199921       *   7/1994

\* cited by examiner

*Primary Examiner*—Harold Y Pyon
*Assistant Examiner*—Monique Peets
(74) *Attorney, Agent, or Firm*—Robert A. Migliorini

(57) ABSTRACT

The present invention relates to a method to produce highly branched polymers with a polyolefin backbone structure of ethylene and precise control of the nature of the branching. In particular, the distribution of branch length and number of branches can be more precisely controlled via the polymerization method of the present invention. The method comprises using anionic chemistry to make unsaturated polydienes with a well-defined, highly-branched structure, and then hydrogenating these polydienes to form highly branched or dendritic saturated hydrocarbon polymers. Highly branched or dendritic polyethylene, ethylene-propylene copolymer and atactic polypropylene are among the saturated hydrocarbon polymers that can be anionically synthesized via the proper selection of diene monomer type, coupling agent, and hydrogenation conditions. These polymers find application in injection molding and extrusion processes as a minor additive for improving processability of linear polyolefins by delaying the onset of melt fracture, and correspondingly increasing melt throughput rates.

10 Claims, 23 Drawing Sheets

PRIOR ART BACK BITING REACTION

PRIOR ART CHAIN TERMINATION REACTION

Double-Tailed Macromonomer Via Anionic Synthesis

Double Macromonomer Produced By Linking Two Living Butadiene Chains Via A Diphenylethylene Silane Coupling Agent 1st Generation Butadiene-Lithium Branch Structure Well-Defined, 1st Generation Dendritic Polybutadiene Structure.

2nd Generation Butadiene-Lithium Branch Structure

Well-Defined, 2nd Generation Dendritic Polybutadiene Structure wd-PBd
(second generation)

Double Macromonomer Produced By Linking Two Living Butadiene Chains Via A Styryl Silane Coupling Agent Double Comb Branch Structure Rheological behavior (η* versus ω) of 3% of PEDC1 in 97% of EX350D60 & 100% EX350D60

Rheological behavior (δ versus G*) of 3% of PEDC1 in 97% of EX350D60 & 100% EX350D60

Synthesized novel macromolecular structures based on double-tipped polybutadiene (PBd) macromonomers

**Double-Combs
(dcPBd)**

**3-Arm-Double-Comb Star
(3-Arm Star dcPBd)**

**Double Molecular Brushes
(dmbPBd)**

General reaction scheme for the synthesis of styrenic-tipped double-macromonomers of PBd and PBd double-combs Apparatus for the synthesis of the Grignard reagent and 4-(dichloromethylsilyl)styrene.
C: 1,2-dibromoethane in THF, B: p-chlorobenzene; F: trichloromethylsilane.

General reaction scheme for the synthesis of 4-(dichloromethylsilyl) styrene (DCMSS)

$^1$H-NMR spectrum of 4-(dichloromethylsilyl)styrene

Apparatus for the synthesis of linear/star double combs and double-molecular brushes.

Size exclusion chromatograms of PBd branch (A), styrenic-tipped double-macromonomers (B) and the corresponding double-comb Size exclusion chromatograms of PBd branch (A), styrenic-tipped double-macromonomer (B), double-comb (C), unfractionated star (D), fractionated star (E)

Size exclusion chromatograms of PBd branch (A), PBd macromonomer (B), and the corresponding double-polymacromonomer (C) (sample 1 of Table 3).

Synthesis of 4-(dichloromethylsilyl)diphenylenthylene (DCMSDPE)

Synthesis of third-generation dendritic polymers

SYNTHESIS AND USE OF WELL-DEFINED, HIGHLY-BRANCHED SATURATED HYDROCARBON POLYMERS

FIELD OF THE INVENTION

The present invention relates to the field of highly branched hydrocarbon polymers. It more particularly relates to an improved composition and method of preparing hyper-branched or dendritic saturated hydrocarbon polymers using anionic polymerization followed by saturation. Still more particularly, the present invention relates to compositions and method of preparing highly-branched saturated hydrocarbon polymers with a more precise placement of the chain branches and a narrower distribution of both chain branch length and number of chain branches.

BACKGROUND

High pressure low density polyethylene (HP-LDPE) is a complicated mixture of highly branched polymers with a very broad molecular weight and structural polydispersity that is nearly impossible to characterize. It was the first form of polyethylene (PE) to become commercially viable and was discovered in 1933. The basic process is the free radical polymerization of supercritical ethylene. Typically this means that the reactions are done at high pressure (over 150 MPa) and temperatures of 150 to 350° C. Some sort of free radical initiator is needed for these reactions, for example, oxygen or peroxides are commonly employed. Two main types of reactors are used—autoclaves and tubular. The polymers made in this process are characterized as having a highly branched structure. This is believed to come about from two main mechanisms.

In one mechanism, the free radical on the growing end of a chain can loop back (mainly five carbon loops) to some other portion of the chain. The loop breaks at the point of reaction, to which the radical is transferred. The loop then becomes a branch off of the chain, which continues to grow from the reaction point as depicted in prior art FIG. 1. This backbiting reaction mainly leads to short branches a few repeat units long (especially butyl branches). Much longer branches are produced from the second mechanism, in which the growing end of a chain terminates on another molecule as depicted in prior art FIG. 2. Several other mechanisms have also been proposed, and the complete suite of reactions that occur has not been firmly elucidated. It is clear though, that these mechanisms result in a very complicated, tree-like architecture with both short and long chain branches. These are called 'low-density' polyethylenes (LDPE) in contrast to the higher density, linear versions. The reason that the products of the high pressure process have lower density is that they are lower in crystallinity. Only long methylene sequences can participate in the paraffin-like crystals of PE, so the side branches serve to lower the crystallizability of LDPE. This effect is mainly due to the short branches (e. g., ethyl, butyl, hexyl) that arise from the backbiting mechanism, simply because there are many more of these. Since the frequency of such branching can be controlled by various process variables (Temperature, Pressure, initiators), so can the density or crystallinity of the polymers.

The lower density structures yield polymers that work well in many extrusion processes. The power needed to extrude the polymer through a die and blow film, for instance, is much less than that for a corresponding linear polymer, however there are poorer mechanical properties (for example tear strength and dart impact) compared to linear polymers. This is due to the long chain branching (LCB) of the HP-LDPE, and more precisely to the nature of the LCB in it, that is, the length, number, and placement of the branches in each molecule, and the distribution of these parameters among the chains. Moreover, the bubble that forms when the film is formed is more stable to rupture with HP-LDPE than LLDPE, allowing higher throughout rates. On the other hand, the mechanical properties of LLDPE films, such as tear strength and dart impact strength, are much greater than for HP-LDPE. To get a balance of both processability and film performance, many film manufacturers use blends of HP-LDPE and LLDPE, but these are clearly still far from the optimum that might be obtained.

U.S. Pat. No. 6,255,424 discloses a convergent method for making dendritic polymer structures via a single step (one pot), anionic polymerization process in a living polymer system. More particularly, a method is disclosed for making vinyl-containing dendritic polymer structures. The method yields a broad distribution of the number of branches and their corresponding length.

A need exists for an improved composition and synthesis method of producing highly branched saturated hydrocarbon polymers with improved control of the branch length, branch number and placement of the long chain branching (LCB parameters), such that the resulting polymer will have both superior processing and mechanical performance. More particularly, a need exists to prepare model comb polyethylenes with one, two, or more linear branches, using anionic polymerization of butadiene and controlled linking chemistry, followed by hydrogenation as disclosed in U.S. Pat. Nos. 6,355,757, 6,391,998, and 6,417,281, all of which are herein incorporated by reference. Still more particularly, a need exists for a synthesis method that yields well-defined branched saturated hydrocarbon polymer compositions, which have either branches on branches or tetrafunctional branched products.

SUMMARY OF THE INVENTION

According to the present disclosure, an advantageous convergent method for anionically synthesizing a highly branched well-defined $1^{st}$ generation polydiene comprises the steps of 1) reacting a diene monomer (d) with sec-BuLi to form a single double-tailed macromonomer of $(Pdd_1)^-Li^+$, 2) coupling two of said single double-tailed macromonomers of $(Pdd_1)^-Li^+$ together in a convergent manner by reacting with dichloro methyl silane diphenylethylene (DCMSDPE) coupling agent to form a double macromonomer of polydiene with a middle active center, 3) reacting said double macromonomer of polydiene with said diene monomer and sec-BuLi at the middle active center to form a $1^{st}$ generation-diene-lithium branch on branch structure, and 4) combining three or more of said $1^{st}$ generation-diene-lithium branch on branch structures by reacting with trichloro silane coupling agent to form highly branched well-defined $1^{st}$ generation polydiene.

A further aspect of the present disclosure relates to an advantageous convergent method for anionically synthesizing a highly branched well-defined 2nd generation polydiene comprising the steps of 1) reacting diene monomer (d) with sec-BuLi to form a single double-tailed macromonomer of $(Pdd_1)^-Li^+$, 2) coupling two of said single double-tailed macromonomers of $(Pdd_1)^-Li^+$ together in a convergent manner by reacting with dichloro methyl silane diphenylethylene (DCMSDPE) coupling agent to form a double macromonomer of polydiene with a middle active center, 3) reacting said double macromonomer of polydiene with said diene monomer and sec-BuLi at the middle active center to form a $1^{st}$ generation-diene-lithium branch on branch structure, and 4) reacting said $1^{st}$ generation-diene-lithium branch on branch structures with DCMCDPE coupling agent followed by the further addition of said single double-tailed macromonomer of $(Pdd_1)^-Li^+$ to form a highly branched well-defined 2nd generation polydiene.

Another aspect of the present disclosure relates to an advantageous convergent method for anionically synthesizing a double-comb polydiene comprising the steps of 1) reacting diene monomer (d) with sec-BuLi to form a single double-tailed macromonomer of $(Pdd_1)^-Li^+$, 2) coupling two of said single double-tailed macromonomers of $(Pdd_1)^-Li^+$ together in a convergent manner by reacting with styryl silane coupling agent to form a double macromonomer of polydiene with a middle active center, 3) reacting said double macromonomer of polydiene with said diene monomer, sec-BuLi and potassium 2,3-dimethyl-pentoxide-3 ($R—O^-K^+$) to form a double-comb diene-lithium branch structure, and 4) combining three or more of said double-comb diene-lithium branch structures by reacting with trichloro silane coupling agent to form a double-comb polydiene.

Numerous advantages result from the advantageous composition, use and method of preparing hyperbranched or dendritic saturated hydrocarbon polymers using anionic polymerization disclosed herein and the uses/applications therefore.

For example, in exemplary embodiments of the present disclosure, the disclosed hyperbranched or dendritic saturated hydrocarbon polymers provide for a narrower distribution of chain branches and more precise placement of chain branch location.

In a further exemplary embodiment of the present disclosure, the disclosed hyperbranched or dendritic saturated hydrocarbon polymers allow for various branch structure including double-comb, 3-arm-double-comb star, and double molecular brushes.

In a further exemplary embodiment of the present disclosure, the disclosed hyperbranched or dendritic saturated hydrocarbon polymers when blended in minor amounts with LLDPE, HDPE, and HMW-HDPE, improve processability by delaying the onset of melt fracture which correspondingly improves melt output rates in extrusion and injection molding operations.

In a further exemplary embodiment of the present disclosure, the disclosed hyperbranched or dendritic saturated hydrocarbon polymers when blended in minor amounts with LLDPE, HDPE, and HMW-HDPE, do not negatively effect mechanical properties such as tear strength and dart impact resistance.

In a further exemplary embodiment of the present disclosure, the disclosed hyperbranched or dendritic saturated hydrocarbon polymers when blended in minor amounts with LLDPE, HDPE, and HNW-HDPE, are particularly useful in forming film, sheet, pipe, fiber and other extruded articles.

In a further exemplary embodiment of the present disclosure, the disclosed hyperbranched or dendritic saturated hydrocarbon polymers may comprise LDPE, ethylene-propylene copolymer and atactic polypropylene by selection of the unsaturated diene monomer used in the anionic polymerization process.

In a further exemplary embodiment of the present disclosure, the disclosed hyperbranched or dendritic saturated hydrocarbon polymers may be formed in a single step reaction comprising unsaturated diene monomers and coupling agents.

These and other advantages, features and attributes of the disclosed hyperbranched or dendritic saturated hydrocarbon polymers and method of synthesizing of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

The present invention relates to improved compositions, method of synthesizing, and uses of highly-branched saturated hydrocarbon polymers. The highly-branched saturated hydrocarbon polymers and process of synthesizing of the present invention are distinguishable over the prior art in permitting a more precise placement of the chain branches and a narrower distribution of both chain branch length and number of chain branches. More particularly, new and well-defined polyethylenes can be used to better understand the way that the behavior of HP-LDPE is controlled by the architecture of the molecules from which it is made.

Synthesis of Model LDPE: The challenge in making these molecules is to produce the branching at many levels with a well-controlled procedure, rather than the random processes that characterize free radical chemistry processes. The reaction scheme depicted below shows how to prepare well-defined PE with one branched branch. The monomer-scale structure of these chains will resemble ethylene-butene copolymers. Butadiene units can go into the chain at either the 1,4 or 1,2 positions with the former position being identical to two ethylene repeat units after saturation, while the latter position is the same as one butene unit. Generally the polybutadiene will have around 8% 1,2, so the saturated analogue will resemble an EB with 8 wt % butene. This amount of short chain branches is very similar to that of HP-LDPE. The synthetic methodology is as follows.

Figure 1:
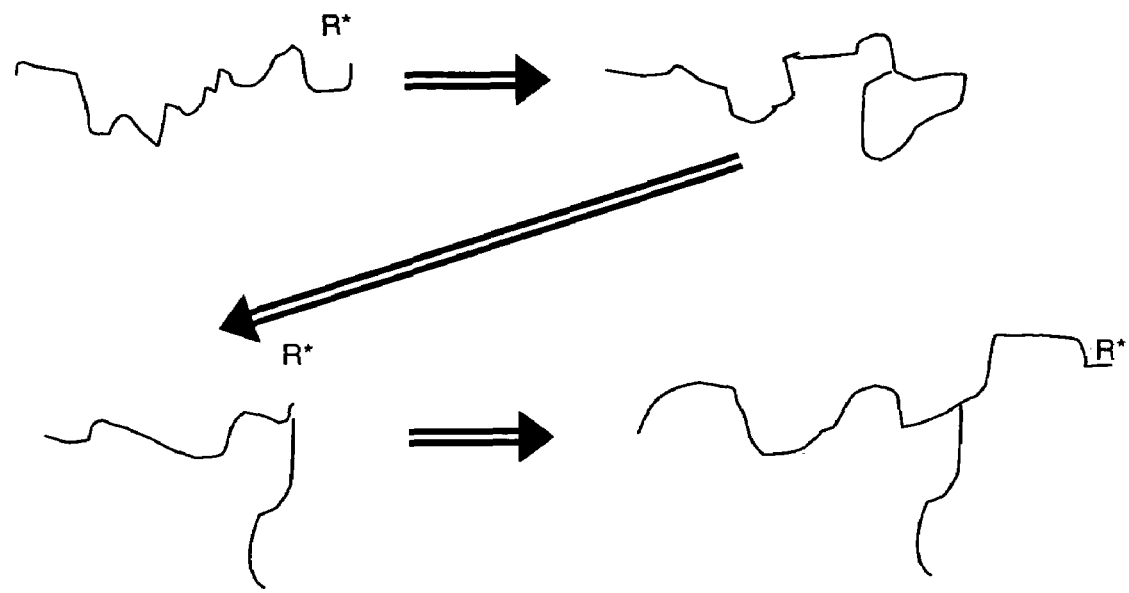
FIG. 1 depicts an illustrative schematic of the prior art back biting reaction for free radical chain branching.
Figure 2:
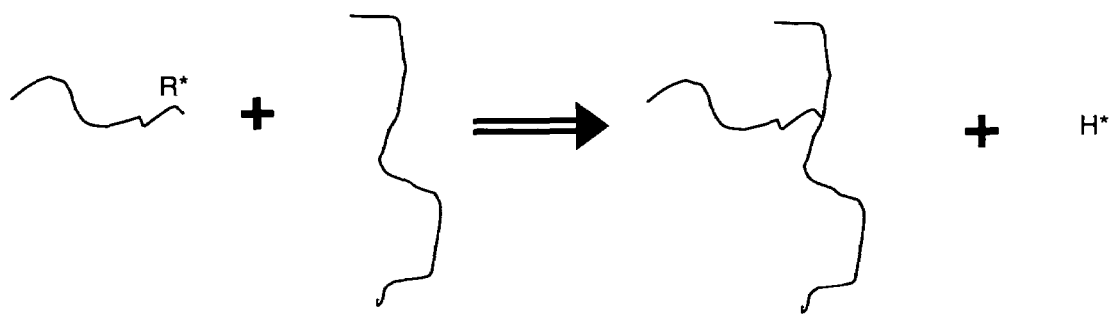
FIG. 2 depicts an illustrative schematic of the prior art chain termination reaction for free radical branching.
Figure 3:
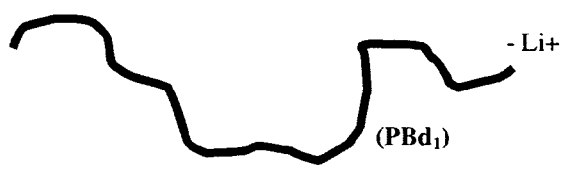
FIG. 3 depicts an illustrative schematic of a double-tailed macromonomer via anionic synthesis.

Anionic synthesis of double-tailed macromonomer. Due to the living nature of this chemistry, the produced polymer will be nearly monodisperse, and the terminal carbon anion as depicted in FIG. 3 allows for further linking chemistry.

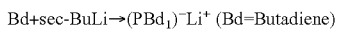

Bd+sec-BuLi→(PBd$_1$)$^-$Li$^+$ (Bd=Butadiene)

Figure 4:
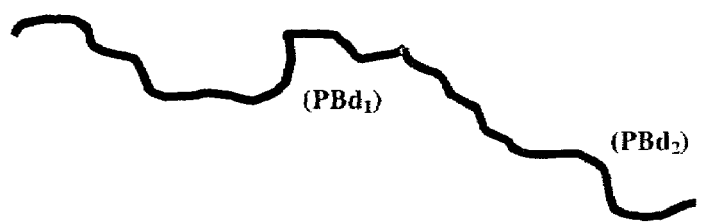
FIG. 4 depicts an illustrative schematic of a double macromonomer produced by linking two living butadiene chains via a diphenylethylene silane coupling agent.

Linking polybutadiene to diphenylethylene silane coupling agent: By attaching this group to two living chains, a double macromonomer as depicted in FIG. 4 can be prepared. This may be done using dichloro methyl silyl diphenylethylene [DCMCDPE, Cl$_2$Si(CH$_3$)C$_6$H$_4$(C$_6$H$_8$)CH=CH$_2$]as follows to yield the following structure.

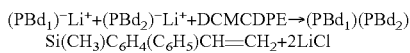

(PBd$_1$)$^-$Li$^+$+(PBd$_2$)$^-$Li$^+$+DCMCDPE→(PBd$_1$)(PBd$_2$)Si(CH$_3$)C$_6$H$_4$(C$_6$H$_5$)CH=CH$_2$+2LiCl

Figure 5:
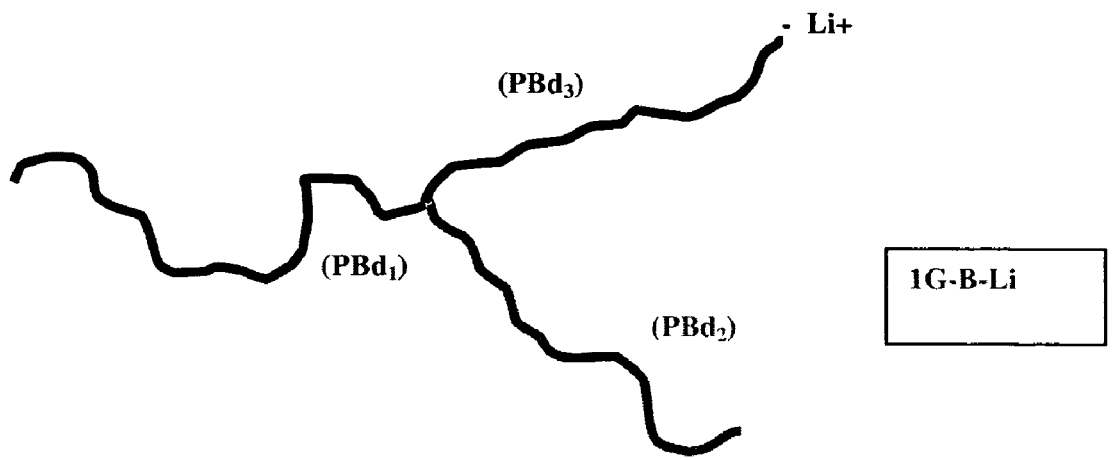
FIG. 5 depicts an illustrative schematic of a $1^{st}$ generation butadiene-lithium branch structure.

Polymerizing the third chain: By adding s-BuLi and more butadiene monomer, a third, nearly monodisperse chain polymerizes from the middle active center as depicted in FIG. 5 via the following reaction. Since each of these three chains can be polymerized independently, they can each have whatever length is required.

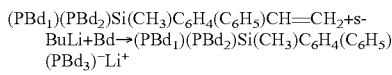

(PBd$_1$)(PBd$_2$)Si(CH$_3$)C$_6$H$_4$(C$_6$H$_5$)CH=CH$_2$+s-BuLi+Bd→(PBd$_1$)(PBd$_2$)Si(CH$_3$)C$_6$H$_4$(C$_6$H$_5$)(PBd$_3$)$^-$Li$^+$ (1st Generation living Branch, 1G-B—Li, branch on branch)

Figure 6:
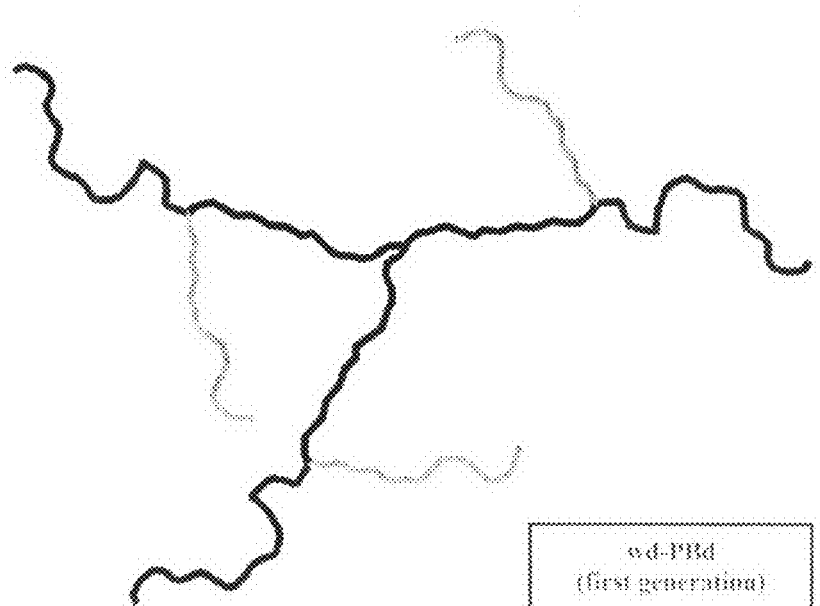
FIG. 6 depicts an illustrative schematic of a well-defined, $1^{st}$ generation dendritic polybutadiene structure.

Combining 1G-B—Li to make well-defined, dendritic PBd: A highly branched PBd as depicted in FIG. 6 is then made by coupling three of these molecules with trichloro silane via the following reaction.

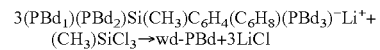

3(PBd$_1$)(PBd$_2$)Si(CH$_3$)C$_6$H$_4$(C$_6$H$_8$)(PBd$_3$)$^-$Li$^+$+(CH$_3$)SiCl$_3$→wd-PBd+3LiCl

Hydrogenation of the wd-PBd gives wd-PE. We have thus made a highly branched PE polymer where the molecular weights of each section are very precisely controlled and can be varied independently. One important factor is to be sure that each branch section is several times the entanglement molecular weight, which is ~1.1 kg/mol for PE.

Figure 7:
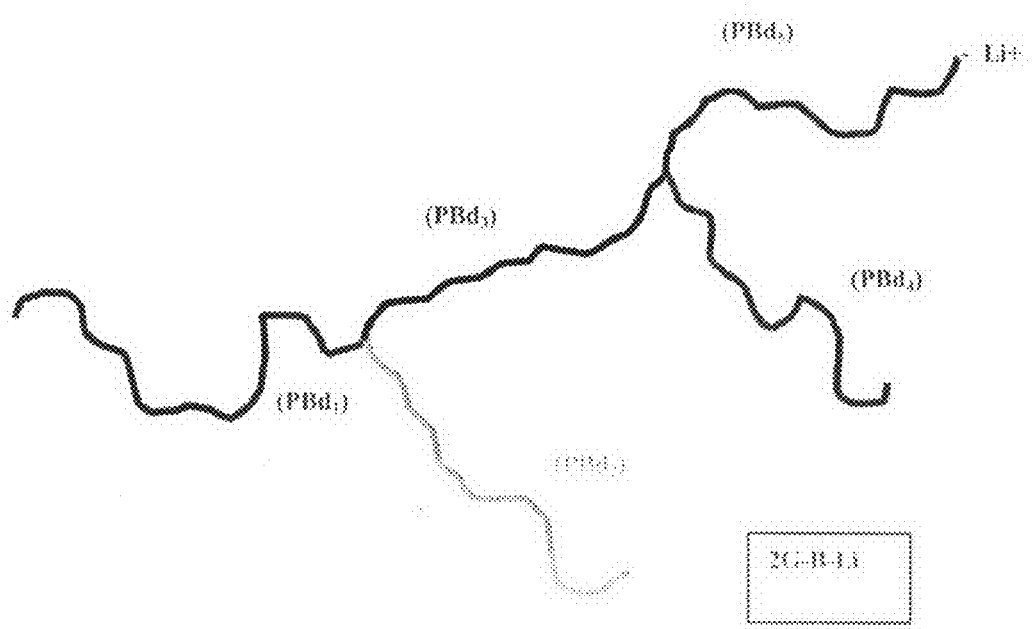
FIG. 7 depicts an illustrative schematic of a $2^{nd}$ generation butadiene-lithium branch structure.

The degree of branching can be increased even further. If instead of reacting with (CH$_3$)SiCl$_3$ the 1G-B—Li is reacted with more DCMSDPE, followed by addition of other living polymers, plus subsequent polymerization of the monomer by the new formed active species, we may produce 2G-B—Li as depicted in FIG. 7.

Figure 8:
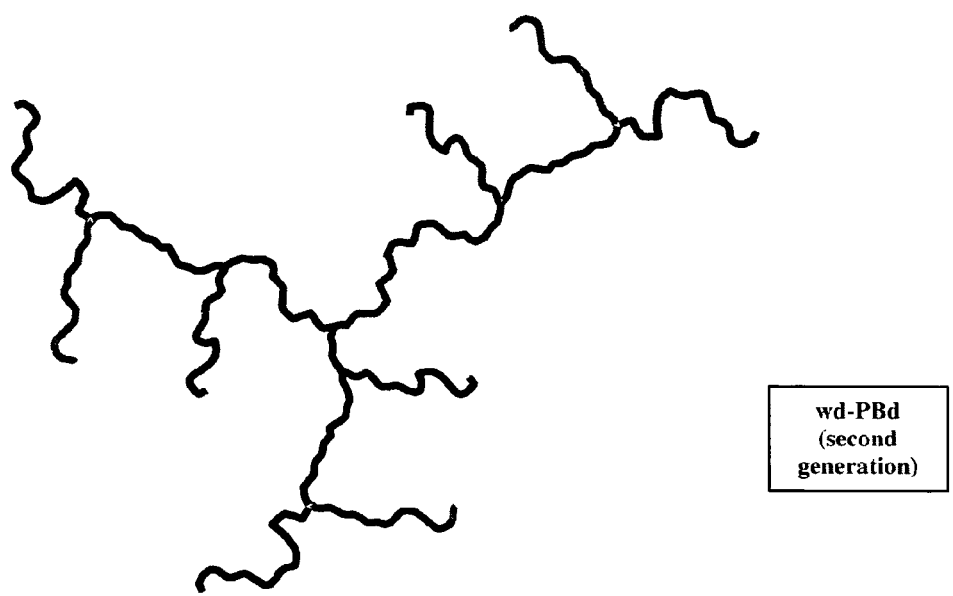
FIG. 8 depicts an illustrative schematic of a well-defined, 2nd generation dendritic polybutadiene structure.

By reaction of the produced 2G-B—Li with (CH$_3$)SiCl$_3$ and hydrogenation, a second generation wd-PE that has branch-on-branch-on-branch structure is produced as depicted in FIG. 8.

Even greater degrees of complexity can be achieved by using hydrosilylation chemistry on PBd as disclosed in U.S. Pat. Nos. 6,355,757, 6,391,998, and 6,417,281 herein incorporated by reference, and reacting the Si—Cl side groups with the 2G-B—Li. Once this is hydrogenated, a wd-PE with many branches-on-branches-on-branches will be produced. A wide range of well-defined, highly branched structures are thus made possible by this chemistry.

Figure 9:
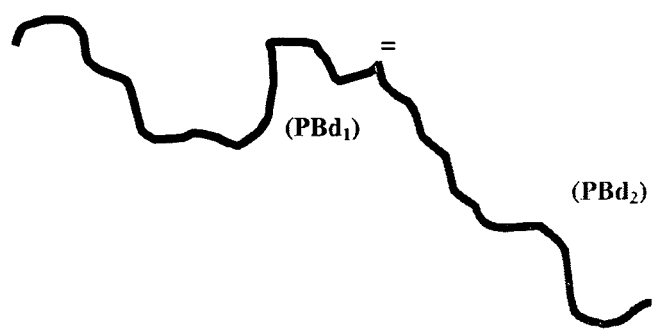
FIG. 9 depicts an illustrative schematic of a double macromonomer produced by linking two living butadiene chains via a styryl silane coupling agent.

Linking Polybutadiene to Styryl Silane Linking Agent:

The double-tailed macromonomer as depicted in FIG. 9 can also be prepared by linking living chains to styryl silane [SS, Cl$_2$Si(CH$_3$)C$_6$H$_4$CH=CH$_2$] as shown by the following reaction:

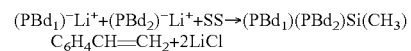

(PBd$_1$)$^-$Li$^+$+(PBd$_2$)$^-$Li$^+$+SS→(PBd$_1$)(PBd$_2$)Si(CH$_3$)C$_6$H$_4$CH=CH$_2$+2LiCl

Figure 10:
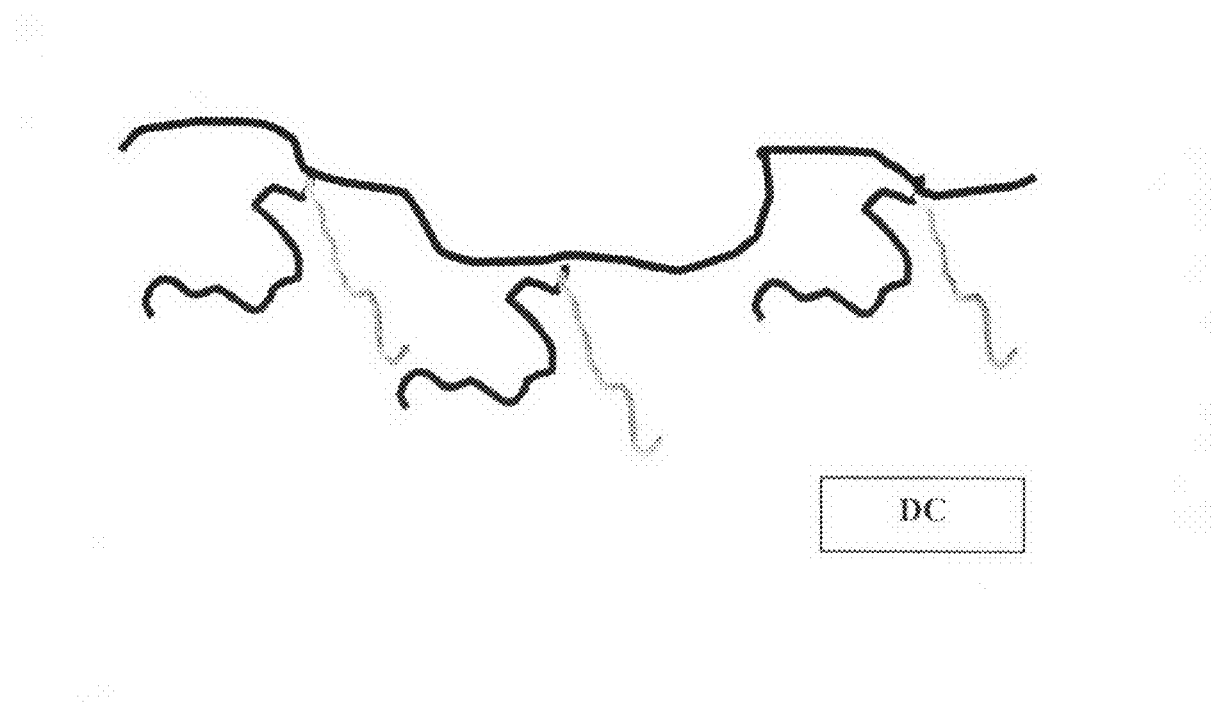
FIG. 10 depicts an illustrative schematic of a double comb branch structure.

Copolymerizing this with more butadiene in the presence of a randomizer such as potassium 2,3-dimethyl-pentoxide-3 [R—O$^-$K$^+$] leads to the so-called 'double-comb' structure as depicted in FIG. 10 and in the following reaction scheme:

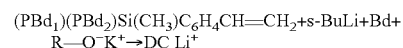

(PBd$_1$)(PBd$_2$)Si(CH$_3$)C$_6$H$_4$CH=CH$_2$+s-BuLi+Bd+R—O$^-$K$^+$→DC Li$^+$

In turn these double combs can be linked just as the linear chains were above to make highly branched dendritic structures. This chemistry is not limited to making model PE long chain branching structures. If isoprene is used in place of butadiene, the same procedures lead to wd-ethylene-propylene copolymer, since hydrogenated polyisoprene has the structure of an alternating ethylene-propylene copolymer. Atactic polypropylene branched polymers can also be made using 2-methyl-1,3-pentadiene as the monomer. Many other polyolefinic branched polymers can be made by this general synthesis technique. Besides butadiene, isoprene, and 2-methyl-1,3 pentadiene, other dienes that will polymerize using anionic initiators include, but are not limited to, 2-ethyl-1,3-pentadiene, 2-propyl-1,3-pentadiene, 2-butyl-1,3-pentadiene, 2-pentyl-1,3-pentadiene, 2-hexyl-1,3-pentadiene, 2-ethyl-1,3-butadiene, 2-propyl-1,3-butadiene, 2-butyl-1,3-butadiene, 2-pentyl-1,3-butadiene, 2-hexyl-1,3-butadiene, 2,3-dimethyl-1,3-butadiene, 2,3-diethyl-1,3-butadiene, 2,3-dipropyl-1,3-butadiene, 2,3-dibutyl-1,3-butadiene, 2,3-dipentyl-1,3-butadiene, 2,3-dihexyl-1,3-butadiene, myrcene (7-methyl-3-methylene-1,6-octadiene), 1,3 cyclohexadiene, other 2-alkyl-1,3-pentadienes, other 2-alkyl-1,3-butadienes, and other 2,3-dialkyl-1,3-butadienes.

The double-comb and dendritic saturated hydrocarbon polymer compositions of the instant invention may find application in for example, but not limited to, blending with LLDPE, HDPE, HMW HDPE and other linear polyolefins, to improve processability without a loss of mechanical properties. For example, the use of such double-comb and dendritic saturated hydrocarbon polymer compositions as additives will delay the onset of melt fracture, enabling higher rates of extrusion in the production of films, pipes, fibers and other extruded forms. The use of such double-comb and dendritic saturated hydrocarbon polymer compositions as additives will also find utility in injection molding processes for improving flow properties of LLDPE, HDPE, HMW HDPE, and other linear polyolefins, such as to improve melt output rates by delaying the onset of melt fracture and improving processability. Only a small or minor amount of a particular kind of long chain branching is sufficient to yield many of the beneficial flow effects of HP-LDPE in extrusion and injection molding processes. The double-comb and dendritic saturated hydrocarbon polymer compositions of the instant invention may be blended with other polyolefins via a number of blending techniques known to those skilled in the art, for example, but not limited to, solution blending and melt blending with other polymers. The other polyolefins will constitute the major amount of the blend.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

The following examples from feasibility studies to produce model double comb structures (FIG. 13) and dendritic structures based on double-tipped polybutadiene macromonomers illustrate the present invention and the advantages thereto without limiting the scope thereof.

EXAMPLES

Double Comb Polymer Examples

Reagents: The purification of the monomer (butadiene, 99% Aldrich), the solvents (benzene, 99.8% Aldrich, and THF, 99.9% Aldrich), the terminating (methanol, 99.9% Aldrich) and the linking agent [$Cl_3(CH_3)Si$, 99% Aldrich], to the standards required for anionic polymerization, was performed using well-established high-vacuum procedures. sec-butyllithium (sec-BuLi), prepared from sec-butylchloride (99.9% Aldrich) and lithium dispersion (99%, high sodium, Aldrich), was the initiator for all polymerizations. Magnesium turnings (Aldrich) were washed with HCl 0.1N, diethyl ether (99.9%, Aldrich) and acetone (99.9%, Aldrich), and then left to dry in vacuum oven overnight. p-chlorostyrene (97%, Aldrich) was distilled in the vacuum-line, from calcium hydride, to ampoules equipped with break-seals. Potassium 2,3-dimethyl-pentoxide-3 ($R-O^-K^+$), the randomizer, was prepared from 2,3-dimethyl-3-pentanol (99%, Aldrich) and potassium in a procedure similar to the one used for the synthesis of sec-BuLi. n-BuLi in hexane (1.6 N, Aldrich) was used as received.

Figure 14:
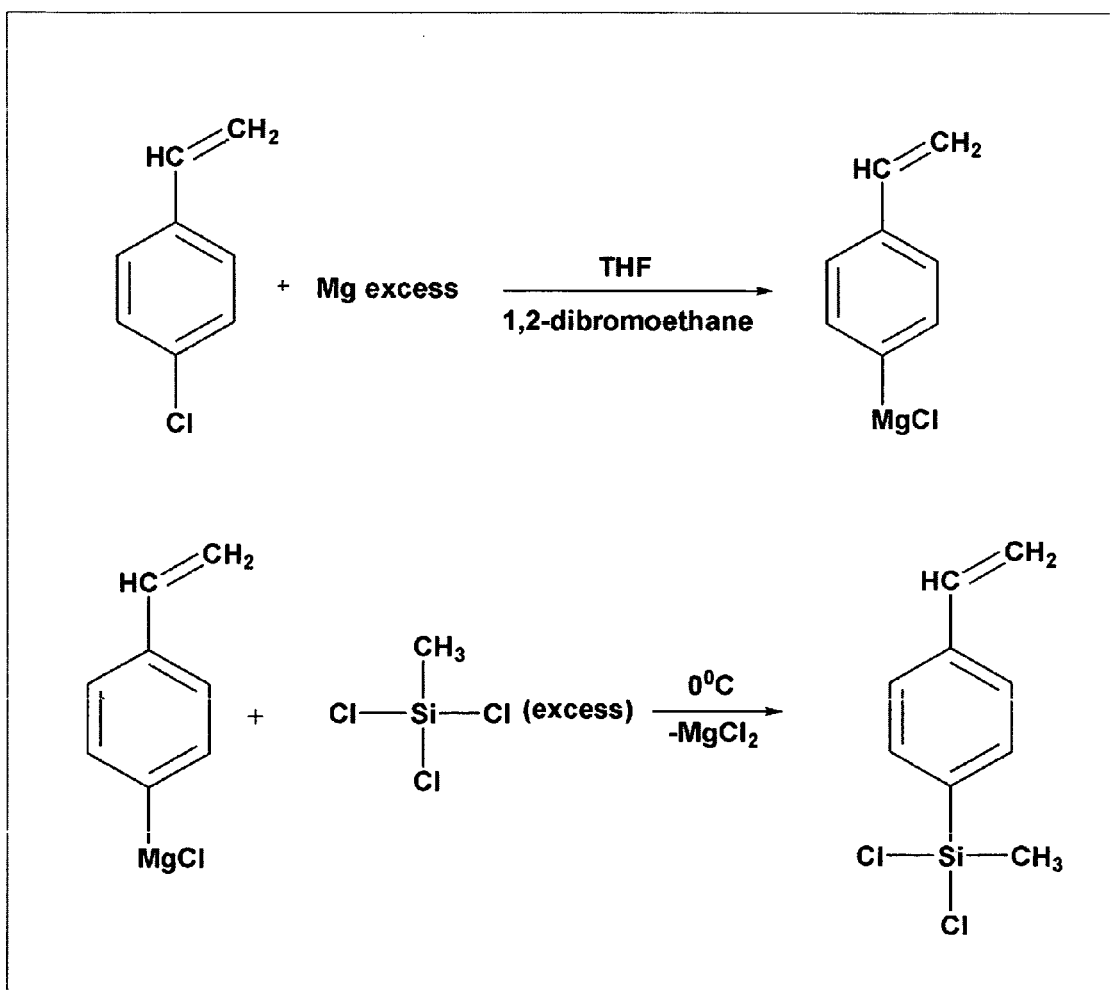
FIG. 14 depicts the general reaction scheme for the synthesis of styrenic-tipped double-macromonomers of PBd and PBd double-combs.
Figure 15:
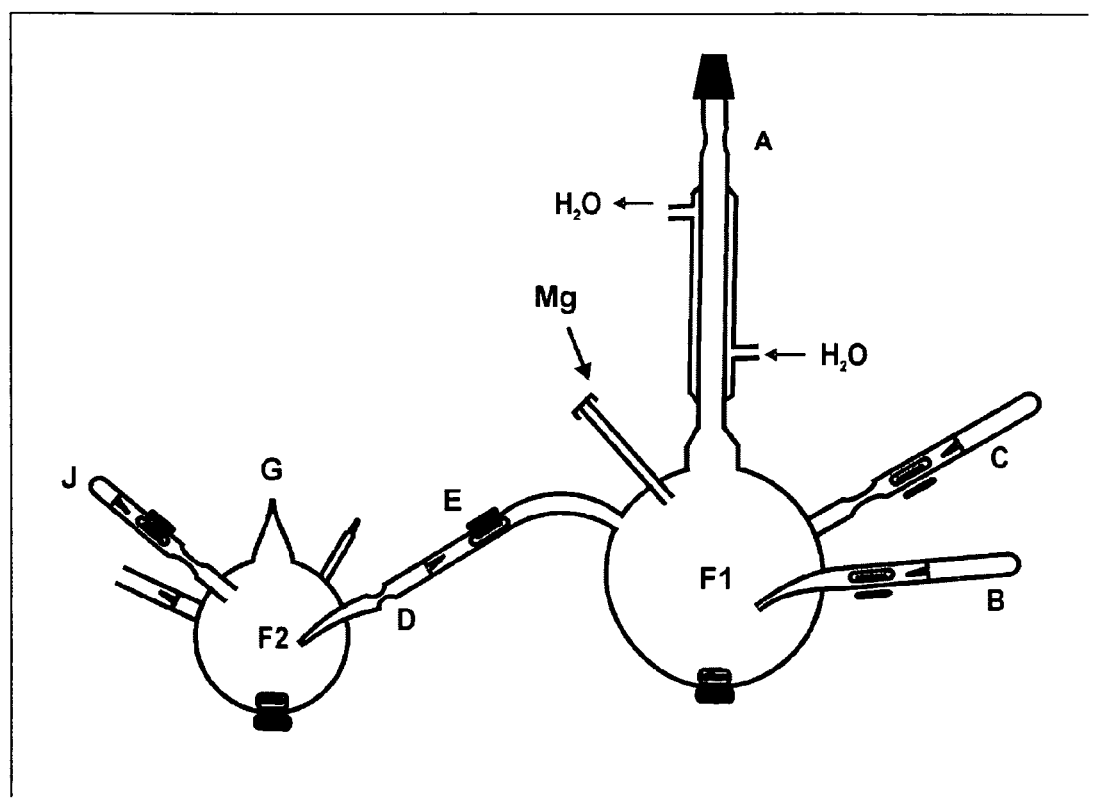
FIG. 15 depicts an illustrative schematic of the apparatus for the synthesis of the Grignard reagent and 4-(dichloromethylsilyl)styrene. C: 1,2-dibromoethane in THF, B: p-chlorobenzene; F: trichloromethylsilane.
Figure 17:
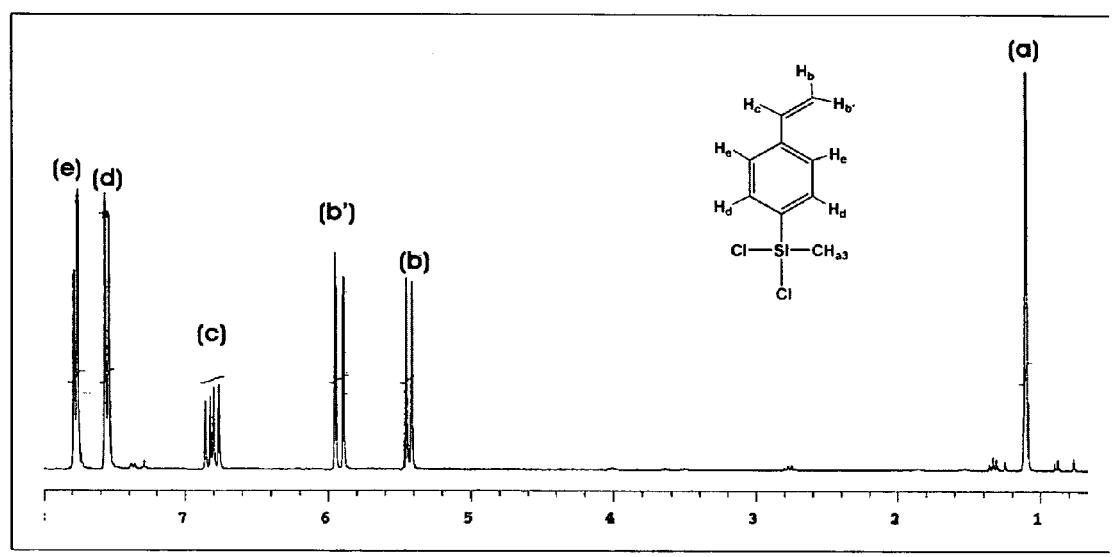
FIG. 17 depicts the $^1$H-NMR spectrum of 4-(dichloromethylsilyl)styrene.

Synthesis of 4-(dichloromethylsilyl)styrene: 4-(dichloromethylsilyl)styrene (DCMSS) was prepared from the Grignard reaction of p-chlorostyrene and trichloromethylsilane according to the reaction scheme in FIG. 14. A specially designed apparatus, consisting of two flasks (F1 and F2), and equipped with a condenser and ampoules with the reagents were used for the synthesis of 4-(dichloromethylsilyl)styrene (DCMSS) (FIG. 15). Before use, the F1 section was rinsed with $Cl(CH_3)_3Si$ for elimination of internal glass impurities. The F2 section was also rinsed with $Cl(CH_3)_3Si$ before being attached to the F1 flask and was dried on the vacuum line through a ground joint that existed in G. After introducing magnesium turnings to the flask F1, through the tube, the tube was closed with a septum, the apparatus was attached to the vacuum line through a ground joint, evacuated and the tube with the septum was sealed off. A solution containing a few drops of 1,2-dibromoethane in 30 ml of THF was added to F1, from the ampoule C, after breaking the corresponding break-seal, and the mixture was stirred for a few minutes to activate the magnesium. The produced ethane was eliminated through the vacuum line, and the apparatus was sealed off at A. An appropriate amount of p-chlorostyrene (mol p-chlorostyrene/mol Mg=1/1.5), purified by distillation over calcium hydride, was introduced drop-wise to the flask after breaking the break-seal of ampoule B, while maintaining the reflux of THF. During the last 30 minutes of the addition of p-chlorostyrene the reflux was supported through slightly heating (~30° C.), which was maintained even after the addition of the whole amount (~2h) for another 1 h. The trichloromethylsilane solution (mol $MeSiCl_3$/mol p-chlorostyrene=2/1) was then introduced to the flask F2 from ampoule J. After cooling F2 at 0° C., the break seal E, which connects the two flasks, was broken and the Grignard reagent, prepared in F1, was added carefully and drop-wise to the silane solution (flask F2), during ~90 min. The section of F1 was eliminated by sealing-off at D. The solution in F2 was left to react for one more hour. The produced DCMSS was transferred, under vacuum, into a specially designed apparatus and distilled twice. The first distillation was to separate DCMSS from $MgCl_2$, produced during the Grignard reaction, and the second one to purify DCMSS. The yield of the whole procedure was about 80%. A typical synthesized quantity of DCMSS was about 8 g. Finally the purified DCMSS was diluted with benzene, and stored at −20° C. in ampoules equipped with break-seals. The $^1H$ NMR spectrum for DCMSS (300 MHz, $CDCl_3$), depicted in FIG. 17, confirmed the successful synthesis of DCMSS. As the peak of the OH protons cannot be seen, we can assume that a dimmer or a tetramer of DCMSS with Si—O—Si bonds was synthesized when the sample of DCMSS interacts with air: δ 6 7.42-7.59 ($C_6H_4$), doublet 5.33-5.9 ($CH_2=CH$), triplet 6.75-6.82 ($CH_2=CH$), singlet 1.15 ($CH_3$—Si—). Integration of the peaks gave the expected ratios for DCMSS.

Figure 18:
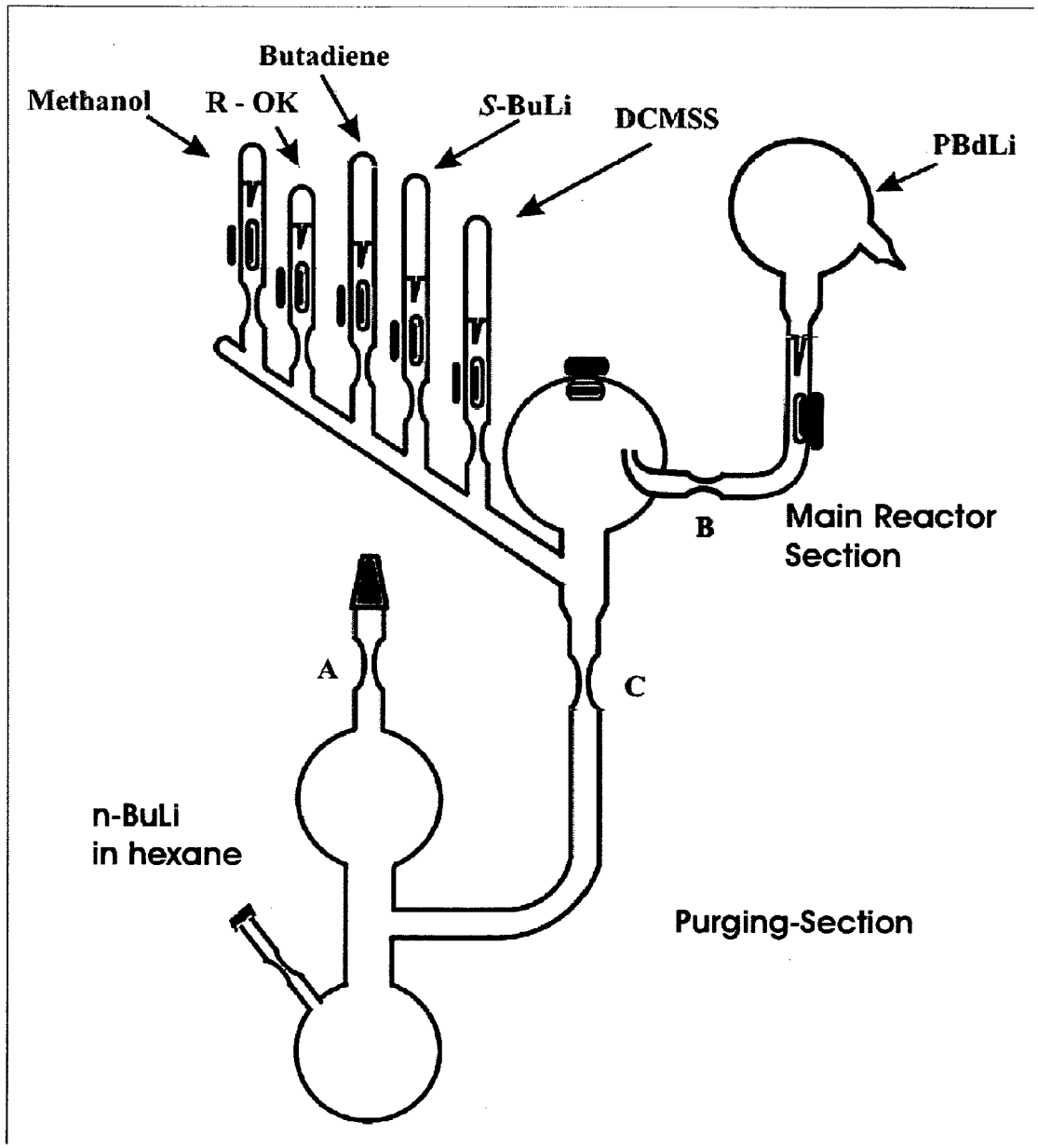
FIG. 18 depicts an illustrative schematic of the apparatus for the synthesis of linear/star double combs and double-molecular brushes.

Synthesis of double-comb polybutadienes: Polymerizations were carried out in evacuated, n-BuLi-washed, and solvent-rinsed glass reactors. Reagents were introduced via break-seals and aliquots for characterization were removed by heat-sealing of constrictions. Full details of the high vacuum techniques are given elsewhere. The apparatus (FIG. 18) was attached to the vacuum line and was evacuated. A few milliliters of n-BuLi solution in n-hexane were introduced through the septum. After distilling benzene through the vacuum line, the apparatus was again evacuated and sealed off at constriction A. It was purged with the n-BuLi benzene solution, and the purging section was removed by heat-sealing at constriction C. The 4-(dichloromethylsilyl) styrene was introduced to the main reactor by breaking the corresponding break-seal. The break-seal of the corresponding ampoule-flask was then broken and the PBdLi, prepared in a secondary reactor and connected to the apparatus, was added drop-wise to the solution of DCMSS. The reaction was monitored by removing small aliquots and analyzing them with SEC. After ~2 equivalents of PBdLi, relative to DCMSS, had been added to the reactor, and more importantly when the end point was judged by SEC, the titration was stopped. The procedure of the titration lasted about three hours. The linking reaction of the first branch with DCMSS took place in about two hours and the reaction of the second branch in the last hour as the reaction was quite decelerated. The flask containing the excess of the living polybutadiene solution was then removed by heat sealing (constriction B). Butadiene was then added to the main reactor and after that the initiator sec-BuLi and the randomizer R—O$^-$K$^+$ were also added at the same time into the main reactor. The polymerization was monitored by removing small samples and analyzing them by SEC. The reaction was considered complete only when the SEC peak of the macromonomer was disappeared. After the completion of the copolymerization (3-4 days), the double-comb PBd was terminated with degassed methanol, precipitated into an excess of methanol, and dried under vacuum, until constant weight.

Synthesis of star double-comb polybutadienes: The same procedure and apparatus was used here as for the linear double-comb polymers. The apparatus has one more ampoule with the linking agent trichloromethylsilane (—SiCl/C—Li=1/1.3). After the completion of the linking reaction (~ two weeks) the excess linear double-comb precursor was eliminated by the well-known solvent (toluene)—non-solvent (methanol) fractionation methodology.

Synthesis of double-polymacromonomers: The preparation of the molecular double-brushes (double-polymacromonomers) followed a similar procedure. The reactor has an ampoule of sec-BuLi instead of butadiene and no randomizer (R—OK) was used. A deep, bright yellow color appeared immediately after the addition of the initiator. The homopolymerization of the macromonomer was completed in 4-5 days.

Molecular Characterization: SEC analysis was performed using a Waters HPLC system equipped with a Waters 501 high pressure liquid chromatographic pump, four Waters Styragel columns having a porosity range of $10^2$-$10^6$ Å, a Waters 410 differential refractometer detector and a UV detector. Tetrahydrofuran was the eluent at a rate of 1 mL/min at 30° C. The instrument was used to determine the polydispersity factor ($I=M_w/M_n$) of all samples and the $M_n$ of the PBd double-macromonomers. Calibration was performed with seven standard PBd samples covering the molecular weight range from 2 to 350 kg/mol. Multi-detector GPC analysis (GPC-RI and GPC-TALLS) was performed using a Waters system equipped with a Waters 1525 high pressure liquid chromatographic pump, Waters Ultrastyragel columns (HR-2, HR-4, HR-5E and HR-6E) with THF eluent at a rate of 1 mL/min at 30° C. A Waters 2410 differential refractometer detector and a Precision PD 2020 two angles (15°, 90°) light scattering detector at 35° C. were used. The instrument was used to determine the $M_w$ and mean square radius of gyration $<S^2>$ of the double-comb precursors/final products. The NMR spectra of the DCMSS and PBd macromonomers were obtained by a Varian Unity Plus 300/54 instrument in CDCl$_3$ at room temperature. The analysis showed that the final comb has practically the same microstructure (1,4~93%; 1,2~7%) as without the presence of the potassium alkoxide.

Figure 16:
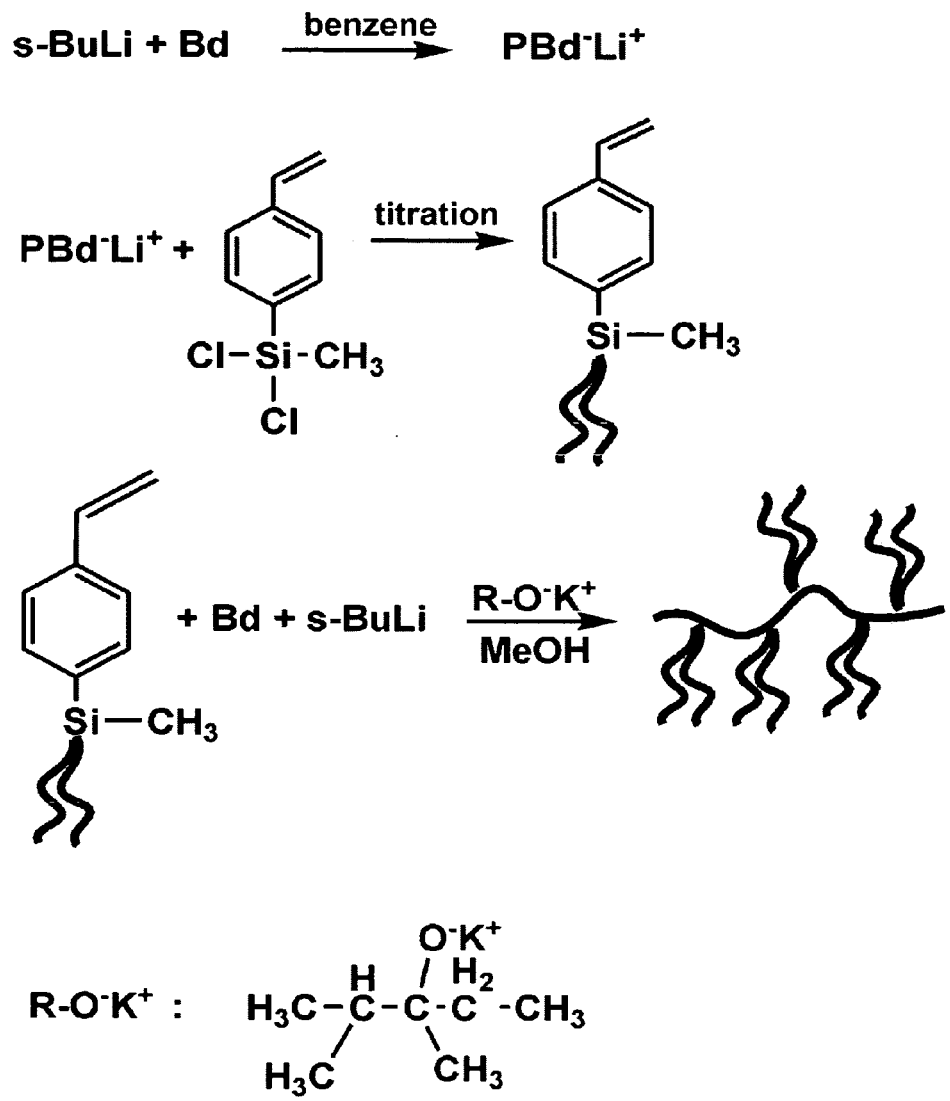
FIG. 16 depicts the general reaction scheme for the synthesis of 4-(dichloromethylsilyl) styrene (DCMSS).

The general synthetic route followed for the synthesis of double-tailed macromonomers and their anionic copolymerization with butadiene is given in FIG. 16. The key factor for the synthesis of the double-macromonomers is the faster reaction of the living polymer with the chlorines of the chlorosilane group (S$_N$) than with the double bond (addition) of DCMSS. The orange color of the styrenic-tipped anion produced, from the reaction of the slight excess living chain with the double bond of DCMSS, allows the visual monitoring of the end-point of the linking reaction. In the case when the molecular weight of the living polymer was higher than 10 kg/mol the stereochemical hindrance almost completely inhibited the reaction with the double bond and visual monitoring of the end point of the linking reaction becomes impossible. The process of the coupling in this case was monitored by SEC.

The key factor for the synthesis of double-comb polybutadienes, dcPBd, was the copolymerization of the macromonomer with butadiene in the same reactor used for the preparation of macromonomer without isolation. Isolation of the macromonomer (precipitation in a non-solvent) introduces impurities. Since the macromonomers are solid materials, their purification to the standards required for anionic polymerization is extremely difficult or impossible, which is the reason that previous attempts failed. The difference between the reactivity ratios of the styrenic-tipped macromonomer and the butadiene monomer led to undesired tapered copolymers. In order to decrease the difference in reactivity ratios and to prepare random combs, the addition of a polar reagent is required. This additive was used in a ratio mole$_{s-BuLi}$/mole$_{R-O^-K^+}$ equal to 30/1. During the copolymerization the solution had the characteristic color of PBdLi meaning that the copolymerization was random. The copolymerization was monitored by SEC. A typical example is given in FIG. 19. The average number of branch points, p, can be calculated by using the relationship (1) below, given the fact that the two monomers, the macromonomer (sMM) and butadiene (Bd) are transformed practically completely to copolymers:

$$p = \frac{\text{mol}_{sMM}}{\text{mol}_{double-comb}} \quad (1)$$

$$= \frac{W_{sMM}/M_{n,sMM}}{(W_{backbone}+W_{sMM})/M_{n,double-comb}}$$

$$= \frac{W_{sMM} \cdot M_{n,double-comb}}{(W_{Bd}+W_{sMM}) \cdot M_{n,sMM}}$$

where W$_{sMM}$ and W$_{backbone}$ (=W$_{Bd}$) are the weight of the two monomers (sMM, Bd) and M$_{n,sMM}$ M$_{n,double-comb}$ the M$_n$ of the double macromonomer and double-comb, respectively. The molecular characteristics are summarized in Table 1 below:

TABLE 1

Molecular characteristics of PBd branches, styrenic-tipped double-tailed macromonomers and corresponding double-combs

| | | PBd branch | | Double-Tailed Macro-monomer | | Double Comb | |
|---|---|---|---|---|---|---|---|
| Sample | p$^c$ | M$_w^a$ (kg/mol) | M$_w$/M$_n^b$ | M$_w^a$ (kg/mol) | M$_w$/M$_n^b$ | M$_w^a$ (kg/mol) | M$_w$/M$_n^b$ |
| dcPBd1 | 3.1 | 5.08 | 1.03 | 10.2 | 1.08 | 136 | 1.07 |
| dcPBd2 | 3.0 | 9.41 | 1.02 | 18.9 | 1.01 | 143 | 1.06 |
| dcPBd3 | 3.2 | 13.3 | 1.02 | 26.6 | 1.01 | 177 | 1.10 |

TABLE 1-continued

Molecular characteristics of PBd branches, styrenic-tipped double-tailed macromonomers and corresponding double-combs

| Sample | p[c] | PBd branch $M_w^a$ (kg/mol) | $M_w/M_n^b$ | Double-Tailed Macro-monomer $M_w^a$ (kg/mol) | $M_w/M_n^b$ | Double Comb $M_w^a$ (kg/mol) | $M_w/M_n^b$ |
|---|---|---|---|---|---|---|---|
| dcPBd4 | 2.5 | 26.3 | 1.02 | 52.6 | 1.06 | 256 | 1.10 |
| dcPBd5 | 4.0 | 4.30 | 1.04 | 8.6 | 1.04 | 108 | 1.07 |

[a]SEC-TALLS in THF at 35° C.,
[b]Size Exclusion Chromatography (SEC) in THF at 30° C., using PBd standards.
[c]Average number of branch points per chain.

Another way to prove that the double combs exhibited the structure claimed is to compare the experimental values (light scattering) of the Zimm-Stockmayer parameter $g = \langle S^2 \rangle_{branched}/\langle S^2 \rangle_{linear}$ with the theoretical ones. $\langle S^2 \rangle$ is the mean square radius of gyration of the branched and linear macromolecules with the same total molecular weight. The theoretical values, $g_{theor}$, were calculated by using the following relationship (2) of Orofino-Berry, valid for most of branched structures examined until now, after appropriate modifications.

$$g_{theor} = \left\{ \frac{(f-2)p[3p(f-2)-2]r^3 + (f-2)p(p+1)[(f-2)(p-1)+3]r^2 + (f-2)p(p+1)(2p+1)r + (p+1)^3}{[(f-2)rp+p+1]^3} \right\} \quad (2)$$

where $f$ is the functionality of the branch points (=4), $r = M_{w\,branch}/M_{w\,connector}$, and $M_{w\,connector}$ is the average molecular weight between two branch points. The $g_{exp}$ and $g_{theor}$ are given in Table 2 below. The $\langle S^2 \rangle_{linear}$ values were calculated from the following experimentally established equation (3) valid for PBd in a good solvent.

$$\langle S^2 \rangle^{1/2} = 1.29 \times 10^{-2} M^{0.609} \quad (3)$$

TABLE 2

Values of the shrinkage factor g for the double-combs.

| Sample | $\langle S^2 \rangle^{1/2}$ (nm) double-comb | Linear | G experimental | theoretical |
|---|---|---|---|---|
| dcPBd1 | 15.1 | 17.25 | 0.77 | 0.75 |
| dcPBd2 | 14.2 | 17.76 | 0.64 | 0.63 |
| dcPBd3 | 14.9 | 20.27 | 0.54 | 0.56 |
| dcPBd4 | 19.3 | 25.33 | 0.58 | 0.55 |
| dcPBd5 | 12.0 | 15.00 | 0.64 | 0.67 |

Figure 20:
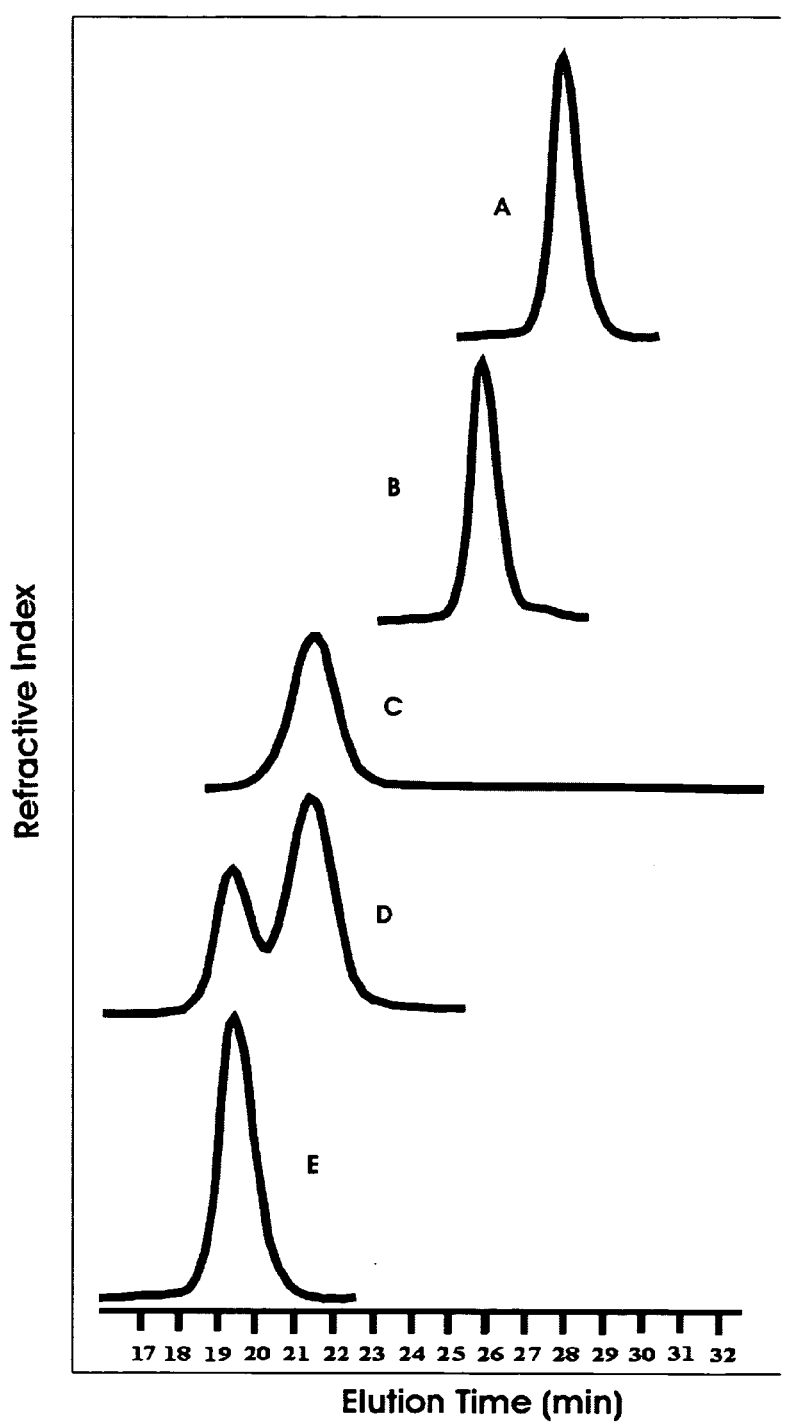
FIG. 20 depicts size exclusion chromatograms of PBd branch (A), styrenic-tipped double-macromonomer (B), double-comb (C), unfractionated star (D), fractionated star (E).
Figure 21:
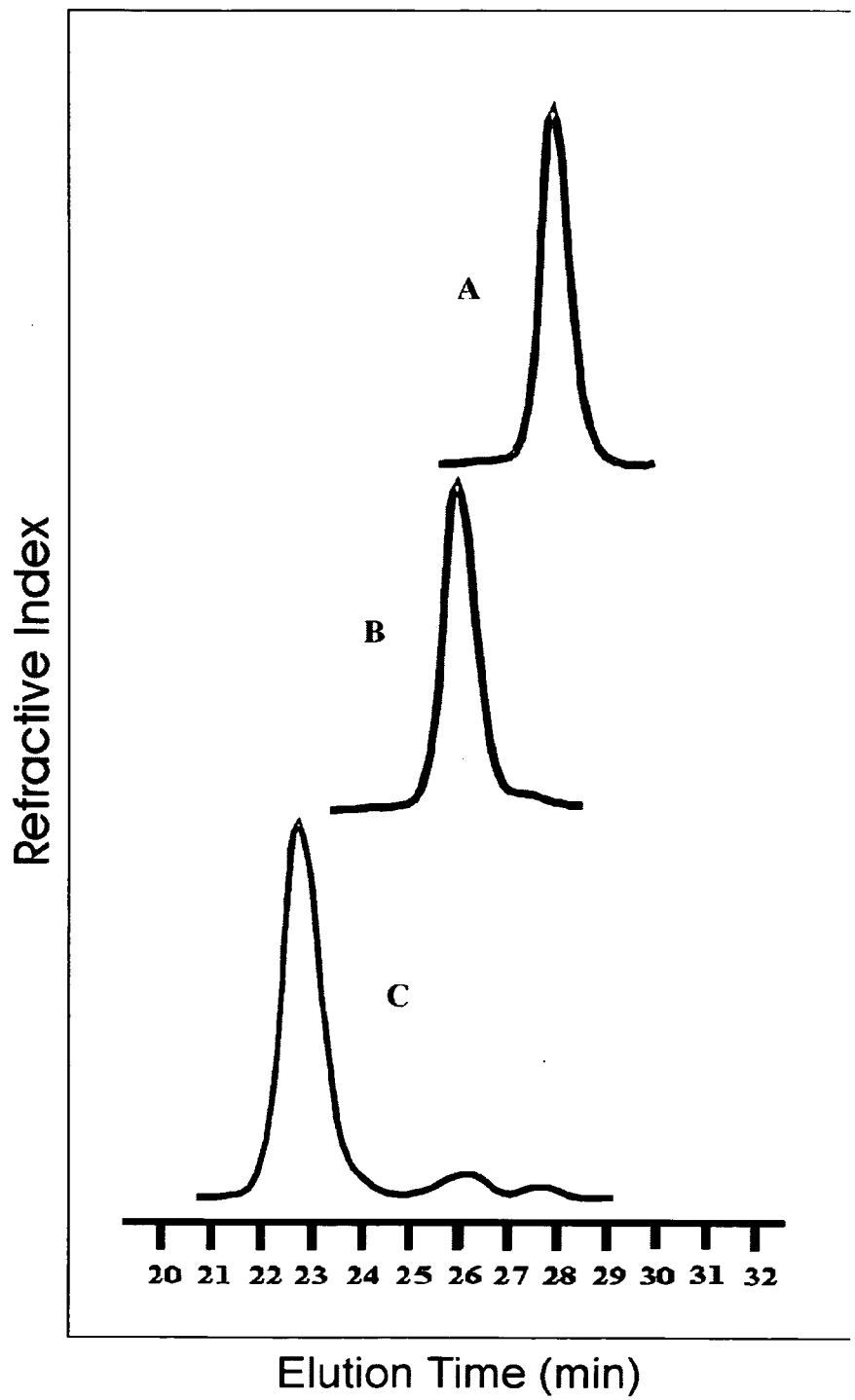
FIG. 21 depicts size exclusion chromatograms of PBd branch (A), PBd macromonomer (B), and the corresponding double-polymacromonomer(C) (Sample 1-Table 3).

A symmetric star having three branches of double-comb PBd was prepared by reacting an excess of the living double-comb PBd with $Cl_3(CH_3)Si$, instead of terminating it with methanol. The star was fractionated until all desirable product was isolated from the reacting double-comb with a solvent/non solvent mixture of toluene/MeOH. The chromatograms of the living branch, the macromonomer, the double-comb, the unfractionated and the fractionated star-double-comb are given in FIG. 20 and the molecular characteristics are summarized in Table 3.

TABLE 3

Molecular characteristics of PBd branch, styrenic-tipped double-macromonomer, double-comb and corresponding symmetric star

| Sample | PBd branch $M_n^b$ (kg/mol) | $M_w/M_n^a$ | Macromonomer $M_w^a$ (kg/mol) | $M_w/M_n^a$ | Double Comb $M_w^b$ (kg/mol) | $M_w/M_n^a$ | Star $M_w^a$ (kg/mol) | $M_w/M_n^a$ |
|---|---|---|---|---|---|---|---|---|
| 1 | 4.30 | 1.04 | 8.6 | 1.04 | 108 | 1.07 | 340 | 1.07 |

[a]Size exclusion Chromatography (SEC) in THF at 30° C., using PBd standards,
[b]SEC-TALLS in THF at 35° C.

Figure 19:
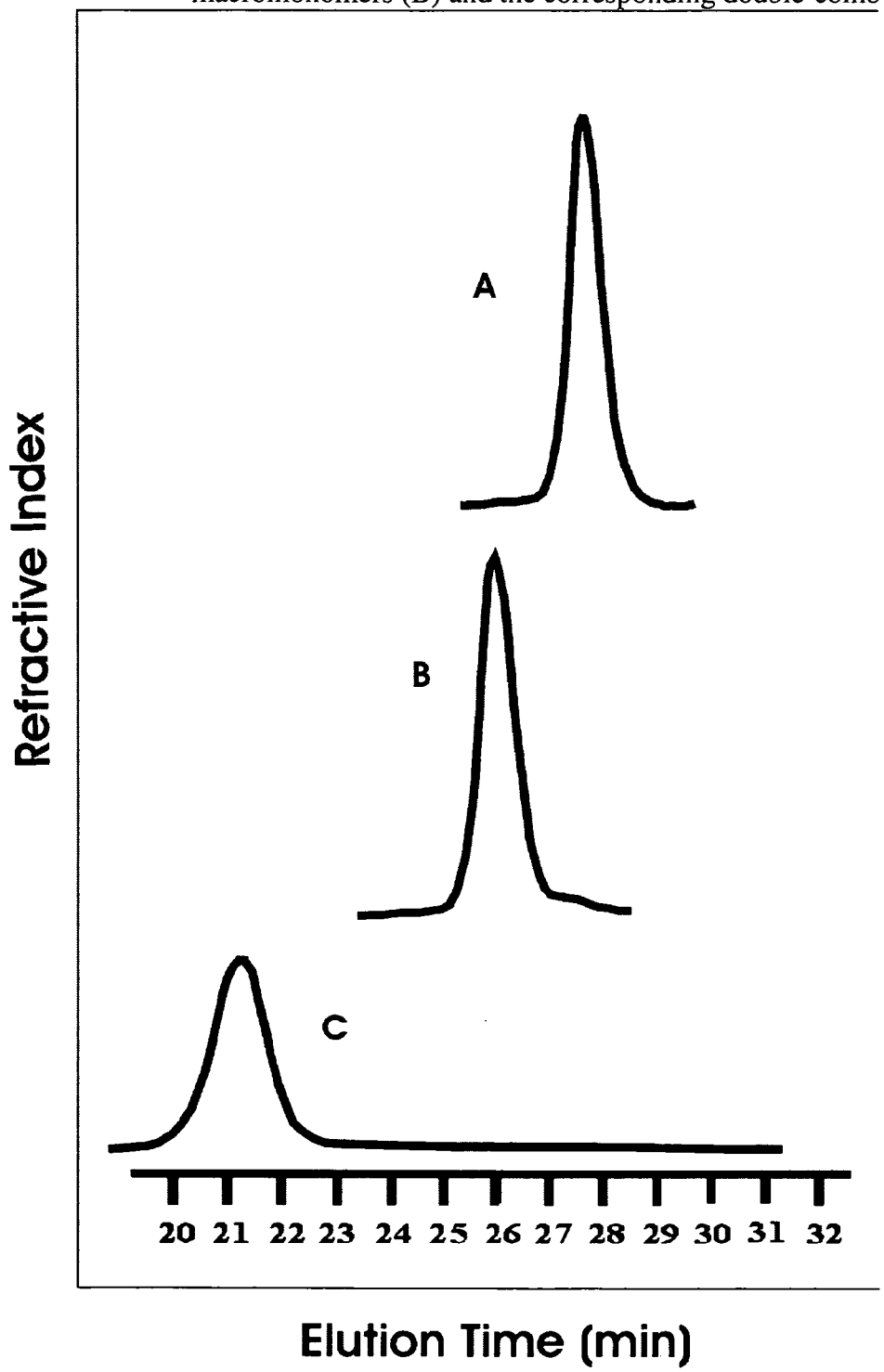
FIG. 19 depicts size exclusion chromatograms of PBd branch (A), styrenic-tipped double-macromonomers (B) and the corresponding double-comb.

Finally a typical example of the synthesis of double-molecular brushes, as monitored by SEC is given in FIG. 19 and the molecular characteristics are summarized in Table 4.

TABLE 4

Molecular characteristics of PBd branches, styrenic-tipped macromonomers and corresponding polymacromonomers.

| Sample | PBd branch $M_n^b$ (kg/mol) | $M_w/M_n^a$ | Macro-monomer $M_w^a$ (kg/mol) | $M_w/M_n^a$ | Poly-macromonomer $M_w^b$ (kg/mol) | $M_w/M_n^a$ | $X_n^c$ |
|---|---|---|---|---|---|---|---|
| 1 | 4.30 | 1.04 | 8.6 | 1.04 | 69.0 | 1.09 | 8.0 |
| 2 | 8.80 | 1.02 | 17.6 | 1.03 | 158 | 1.09 | 9.0 |
| 3 | 1.34 | 1.09 | 2.7 | 1.09 | 79.5 | 1.05 | 29.4 |
| 4 | 3.19 | 1.04 | 6.4 | 1.05 | 64.0 | 1.10 | 10.0 |

[a]Size Exclusion Chromatography (SEC) in THF at 30° C., using PBd standards,
[b]SEC-TALLS in THF at 35° C.,
[c]Degree of polymerization.

Double Comb Hydrogenation Examples

Hydrogenation: The polybutadienes were saturated catalytically. Typically the polybutadiene was dissolved in cyclohexane and reacted with $H_2$ gas at 90° C. and 700 psi in the presence of a catalyst made by supporting Pd on CaCO$_3$. The mass of catalyst used was equal to that of the polymer. The reaction was allowed to proceed until the H$_2$ pressure stopped dropping, or generally about 24 h. The polymer solution was then filtered to remove the catalyst residues. The saturation of the polymer was seen to be greater than 99.5% by $^1$H NMR. The result in each case was a model for polyethylene.

Figure 11:
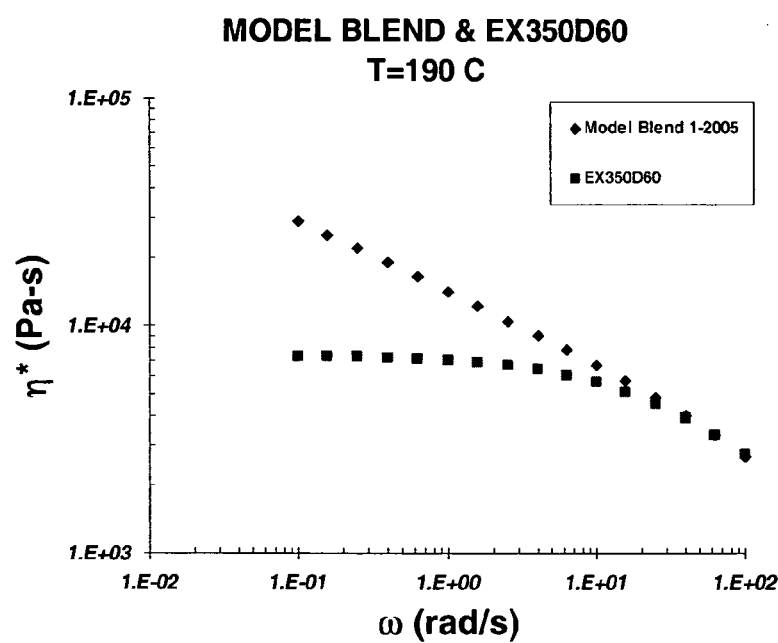
FIG. 11 depicts a graphical representation of the Theological behavior ($\eta$*versus $\omega$) of 3% of PEDC1 in 97% of EX350D60 and 100% EX350D60.
Figure 12:
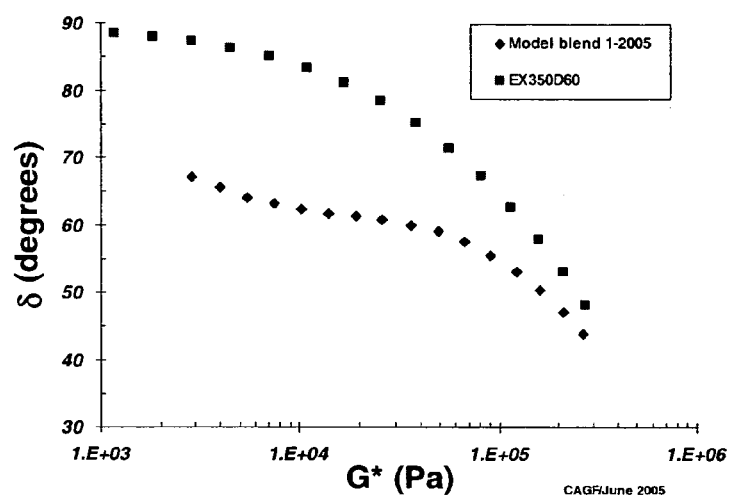
FIG. 12 depicts a graphical representation of the rheological behavior ($\delta$ versus G*) of 3% of PEDC1 in 97% of EX350D60 and 100% EX350D60.
Figure 13:
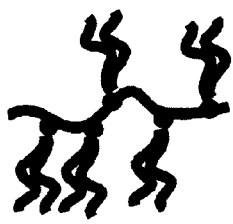
FIG. 13 depicts an illustrative schematic of synthesized novel macromolecular structures based on double-tipped polybutadiene (PBd) macromonomers.
Figure 13:
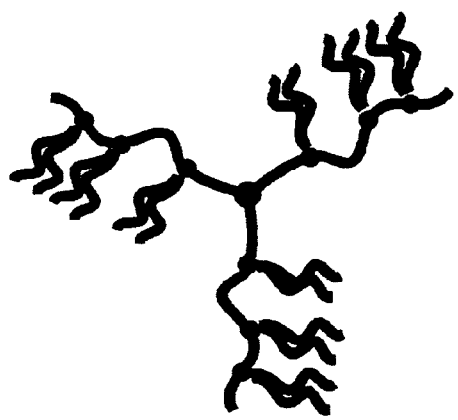
Figure 13:
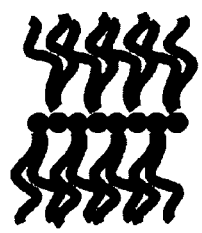

Double Comb Polymer Rheology:

In particular, one of these (which we call PEDC1) has a backbone of molecular weight 100 kg/mol and three branch points, each having two arms of molecular weight 5 kg/mol. We have measured the rheology of a blend with 3% of PEDC1 in 97% of EX350D60, as well as that of the pure EX350D60. The effects are dramatic, as can be seen in FIGS. 11 and 12. FIG. 11 shows how the shear thinning of the PE is greatly enhanced by the addition of small amounts of the branched model polymer, while FIG. 12 depicts the same behavior in the form of the Van Gurp plot. These polymers will be extremely effective processability modifiers for polyolefins. The linear viscoelastic properties (dynamic moduli) of these polymers were measured with a Paar-Physica (MCR-500) controlled stress rheometer. Measurements were performed at 190° C. using a parallel plate (d=25 mm) geometry. Linearity of the mechanical response was obtained with a variable stress input (2000 Pa to 100 Pa) over a frequency range of 100 rad/s to 1 rad/s. Nitrogen atmosphere was used during the test to minimize thermally induced chemical changes. The so-called Van-Gurp plot (phase angle $\delta=\tan^{-1}(G''/G')$ plotted against the log of the absolute value of the complex modulus, |G*|) provides an excellent means to analyze linear viscoelasticity. This representation renders a plot invariant of the temperature and the molecular weight, but very sensitive to the effects of the molecular weight distribution and the presence of short and long chain branching. FIG. 13 nicely shows that the addition of long chain branching component makes the model blend more elastic than the linear polymer (EX350D60), and introduces a power law relaxation region (between 10 and 50 kPa)

Dendritic Polymer Examples

Materials: Butadiene (Aldrich; >99%), all solvents [tetrahydrofuran, benzene, and hexane, all reagent-grade], the terminating agent (methanol), and the coupling agent (trichloromethylsilane, Aldrich; >99%) were purified using high-vacuum techniques and standard procedures described in detail elsewhere. sec-Butylchloride (99.9%, Aldrich), dried over CaH$_2$ overnight, degassed, and distilled in a vacuum line, was reacted, in a suitable high-vacuum apparatus, with excess Li (99% with high sodium, Aldrich) in hexane to produce the initiator, s-BuLi. Methyltriphenylphosphonium iodide (97%, Aldrich), n-BuLi (1.6 M in hexane, Aldrich), 4-Bromobenzophenone (98%, Aldrich), and MgSO$_4$ were used as received. Magnesium turnings (Aldrich) were activated by sequential washings with a 0.1 N HCl solution (two times), distilled water (five times), diethyl ether (five times), and acetone (five times) and dried in a vacuum oven to a constant weight. Similar apparati and the same characterization methods were used as in the case of the double-tailed combs.

Figure 22:
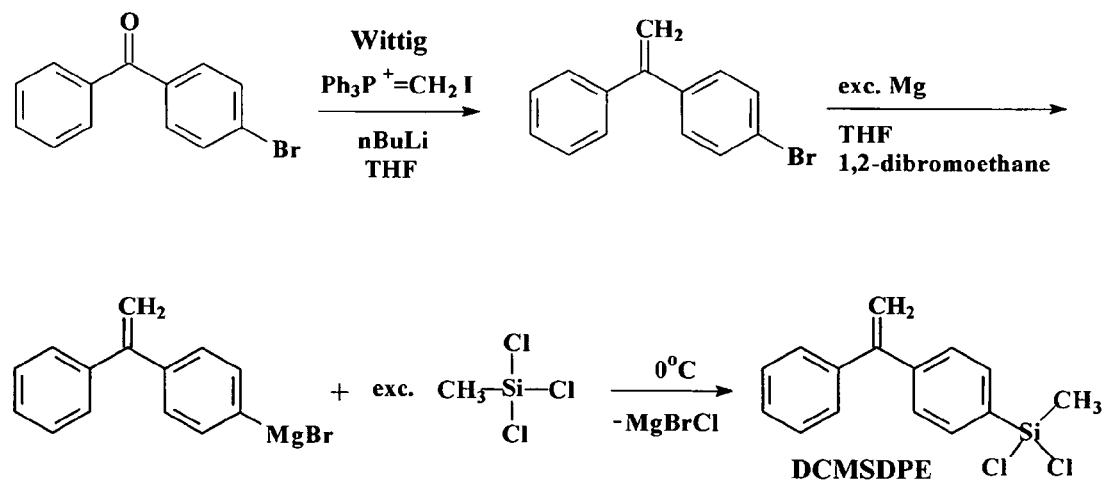
FIG. 22 depicts the reaction scheme for the synthesis of 4-(dichloromethylsilyl)diphenylethylene (DCMSDPE).

Synthesis of 4-(Dichloromethylsilyl)diphenylenthylene (DCMSDPE): DCMSDPE was prepared from the Grignard reagent of 4-bromodiphenylethylene and trichlorodimethylsilane using specially designed apparati and high-vacuum techniques. 4-bromodiphenylethylene the product of the Wittig reaction between 4-bromobenzophenone and methyltriphenylphosphonium iodide, in the presence of n-BuLi. The synthetic route is given in FIG. 22 and the experimental procedure is as follows. To a 500 mL round-bottom flask fitted with a dry nitrogen inlet septum, methyltriphenylphosphonium iodide (31 g, 76 mmol) was suspended in dry THF under a nitrogen atmosphere. n-BuLi (47.5 mL of 1.6 M in hexane, 76 mmol) was added to the suspension at room temperature with stirring. The mixture became dark red, and the solution was allowed to stir for an additional half-hour. 4-Bromobenzophenone (20 g, 76 mmol) was then added via a syringe over 30 min with vigorous stirring at room temperature. The mixture became yellow and was stirred overnight at room temperature under a nitrogen atmosphere and then diluted with 150 mL of chloroform and 150 mL of dilute hydrochloric acid aqueous solution (0.1 N). The organic phase was collected, washed, and dried over MgSO$_4$. The solvent was removed by rotor evaporation and ~100 mL of hexane were added. The precipitate was filtered and the hexane solvent condensed, followed by a new addition of hexane. This procedure was repeated several times until no precipitation took place after addition of hexane. The resultant residue was purified by chromatography on silica gel using n-hexane as the eluent to yield ~10 g of 4-bromo-DPE as a yellow oil.

Synthesis of DCMSDPE: A special designed glass apparatus (FIG. 15) was used for the synthesis of DCMSDPE. After introducing magnesium turnings (1.9 g, 78.2 mmol) through the tube B, the tube was closed with a septum, the apparatus was attached to the vacuum line through a ground joint, evacuated, and sealed off at the tube B. A solution of a few drops of 1,2-dibromoethane in 20 mL of THF (ampoule C) was added to the flask and the mixture was stirred for a few minutes to activate the magnesium. The produced ethane was eliminated, and the apparatus was sealed off at a. A small portion of 4-bromo-DPE (5 g, 19.3 mmol) in 30 mL of THF (ampoule D) was introduced dropwise to the flask while maintaining the reflux of THF. After the addition was completed (~1 h), the reaction mixture was allowed to stir for an additional 5 h at 45° C. The trichloromethylsilane diluted in 20 mL of THF (5.8 g, 38.8 mmol) (ampoule E) was first introduced to the main flask F2, and after cooling at 0° C. the Grignard reagent was added drop-wise to the silane solution in ~90 min. The reaction mixture was allowed to stir for an additional 1 h at 0° C. Flask F2, as well as all the apparatuses that were used from this point up to final distillation of the pure DCMSDPE had been first rinsed with Me$_3$SiCl and dried on the vacuum line overnight.

The crude product of the reaction (containing DCMSDPE, THF and excess MeSiCl$_3$) was condensed in the vacuum line to eliminate the volatile compounds and ~120 ml of hexane were distilled into the flask F2 (FIG. 15). After evacuating and detaching the flask from the vacuum line, the solution was kept at −20° C. for 2 days until partial precipitation of MgBrCl and then was filtered through a glass filter to the second flask F3 of the apparatus. The product was left in the vacuum line (10$^{-6}$ Torr), with continuous stirring at 40° C., for 3 h to eliminate the last traces of hexane, THF and MeSiCl$_3$ and was subsequently distilled, at a high temperature (140-150° C.), into a new apparatus (FIG. 15) to separate DCMSDPE from MgBrCl and other solid byproducts, e.g., thermally polymerized DCMSDPE). Finally, pure DCMSDPE (3 g, 10.2 mmol) was distilled into ampoules at ~110° C., diluted in benzene, and stored at −20° C. The $^1$H NM spectrum confirms the successful synthesis of DCMSDPE. $^1$H NMR (CDCl$_3$): δ 7.7-7.8 (2H, d, Ar—H), 7.46-7.52 (2H, d, Ar—H), 7.37 (5H, m, Ar—H), 5.55-5.62 (2H, d, C=CH$_2$), 2.34 (1H, m, Si—OH), 1.1 (3H, m, Si—CH$_3$). Integration gave the expected ratios of the protons.

Figure 23:
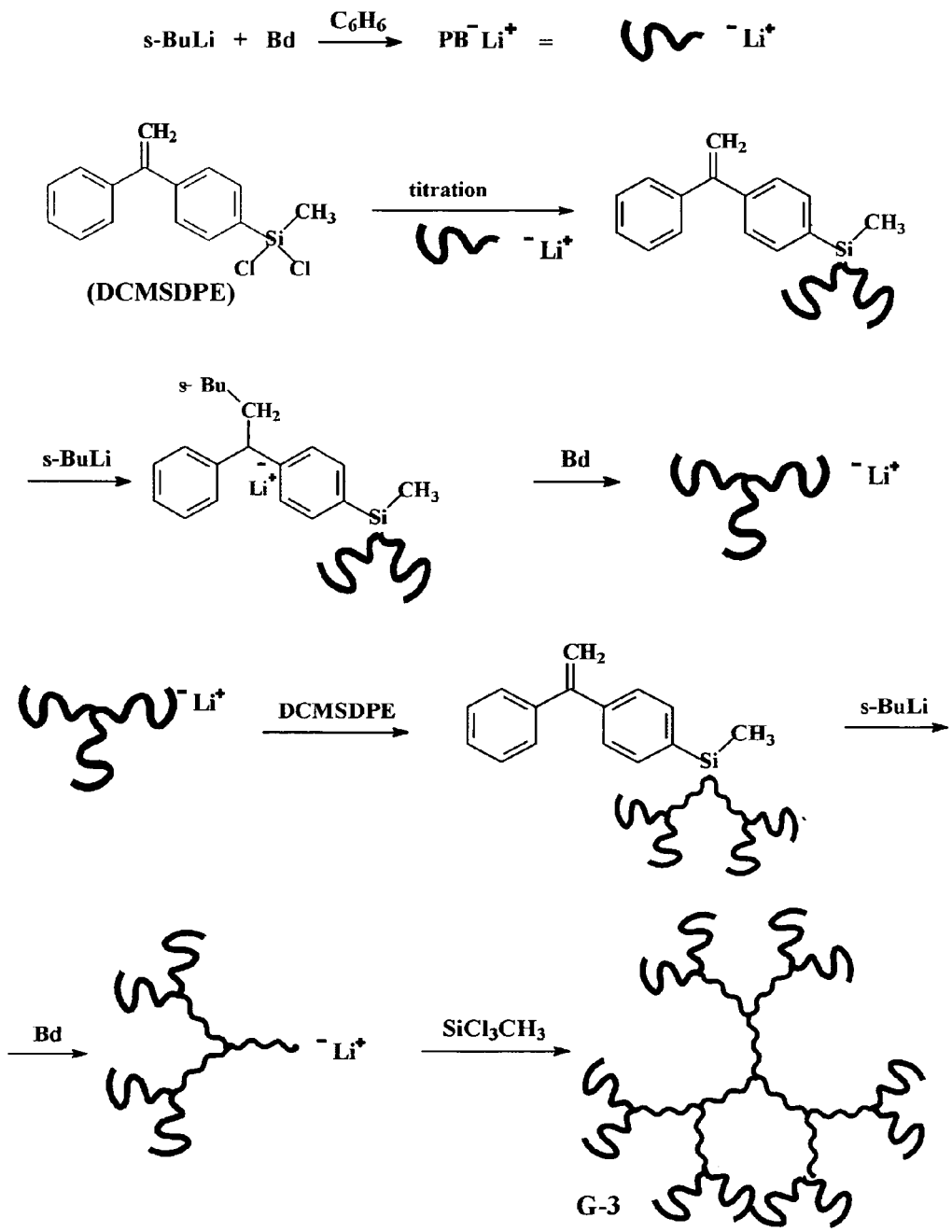
FIG. 23 depicts the reaction scheme for the synthesis of third-generation dendritic polymers.

Dendritic Polymer Synthesis:

Polymerization and linking reactions were carried out in evacuated, n-BuLi washed and solvent-rinsed glass reactors. Reagents were added via break-seals, and aliquots for characterization were removed by heat-sealing of constrictions. Full details of the apparatuses and techniques used are given elsewhere. The synthetic route is given in FIG. 23.

Synthesis of G-2 Dendritic Polymers:

The living polybutadiene (PBLi) was synthesized by polymerization of the butadiene monomer with s-BuLi in benzene at room temperature for 24 h, collected in a precalibrated ampoule equipped with break-seal and connected to the macromonomer synthesis apparatus (FIG. 15). The living polybutadiene (8 g in 50 mL of benzene, $M_{w(TALLS)}$=4.79 Kg/mol, 1.7 mmol) of the G-2 branch was added dropwise to the reactor F5 containing DCMSDPE in benzene (0.176 g, 0.6 mmol in 100 mL of benzene) with continuous and vigorous stirring. The reaction was monitored by taking samples (F) and analyzing them by SEC. After ~2 equiv of PBdLi (5.7 g, 1.2 mmol), relatively to DCMSDPE, had been added to the reactor, and when the end point was judged by SEC, the titration was stopped. The addition was carried out over a period of approximately 12 h, after the first six hours a permanent yellow color appeared. The excess living PBd (2.3 g, 0.5 mmol) was removed from the apparatus by heat-sealing the constriction of the corresponding ampoule. The solution of the macromonomer was then transferred into flask F6 and was connected to a second apparatus (FIG. 18) where firstly the appropriate amount of initiator s-BuLi (0.6 mmol) was added. The color immediately turned from yellow to deep red indicating the opening of the double bond of the diphenylethylene, which consists the end group of the macromonomer. The solution was left under stirring for 48 hours, in order to ensure that all the DPE groups react with s-BuLi. The appropriate quantity of butadiene (2.5 g) was added and after complete polymerization (~24 h) an aliquot was taken from the reactor for characterization and the linking agent, trichlomethylsilane (0.16 mmol), was introduced. The reaction was monitored by removing small aliquots and analyzing them by SEC. The linking reaction was completed in 25 days. The reaction product, after neutralization of the excess of the living species with degassed methanol, was fractionated by the toluene/methanol system. The fractionated G-2 dendritic copolymer was precipitated into an excess of methanol and dried under vacuum, until constant weight. The molecular characterization results are given in Table 5.

TABLE 5

| Sample | $M_w^b$ Arm (G-2) (kg/mol) | $M_w^b$ Arm (G-1) (kg/mol) | $M_w^c$ Dendrite (kg/mol) | $M_w^b$ Dendrite (kg/mol) | $(M_w/M_n)^a$ dendrite | Weight (g) |
|---|---|---|---|---|---|---|
| 1 | 3.25 | 5.55 | 36.15 | 34.74 | 1.04 | 0.8 |
| 2 | 4.79 | 13.97 | 70.65 | 65.25 | 1.07 | 0.6 |
| 3 | 14.30 | 12.16 | 122.28 | 115.37 | 1.05 | 1.36 |
| 4 | 18.98 | 23.24 | 183.60 | 172.93 | 1.05 | 3.66 |
| 5 | 25.06 | 21.43 | 214.65 | | | |
| 6 | $M_n^a$ = 38.01 | | | | | |

$^a$SEC in THF at 30° C., using PBd standards.
$^b$Obtained by SEC-TALLS in THF at
$^c$Calculated from the molecular weights of the arms.

Synthesis of G-3 Dendritic Polymers:

The preparation firstly of the linear living polybutadiene branch (8 g, $M_{w(TALLS)}$=4.79 kg/mol, 1.7 mmol) and secondly of the living three-arm star PBd$^-$Li$^+$ (8.2, 0.6 mmoles) followed exactly the same procedure as mentioned for the synthesis of G-2 dendritic polymers. In this case the produced living polybutadiene star (PBd$^-$Li$^+$) was collected into flask F7 and connected to a new apparatus similar to the one of FIG. 15, where a second titration took place. PBd$^-$Li$^+$ was added dropwise to the reactor containing DCMSDPE in benzene (0.07 g, 0.24 mmol in 100 mL of benzene) under stirring. The second titration was also monitored by removing small aliquots and analyzing them with SEC. After ~2 equiv of PBd$^-$Li$^+$ (0.48 mmol), relatively to DCMSDPE, had been added to the reactor, and when the end point was judged by SEC, the titration was stopped. The second titration lasted about 24 hours, that is longer than the first one because the living polymer was a living star in this case and not a linear branch and therefore the coupling reaction was slower due to the greater steric hindrance. The excess PBd⁻Li⁺ (~0.12 mmol) was removed and kept for characterization and again the macromonomer was transferred into another apparatus FIG. 18) were initially the appropriate amount of initiator s-BuLi (0.24 mmoles) was added. The color immediately turned from deep yellow to deep red and after for 48 hours under stirring a new amount of butadiene (1 g) was introduced. An aliquot was taken from the reactor for characterization and finally trichlomethylsilane (0.06 mmol) was added. After the completion of the linking reaction (~30 days), the excess of the living species was neutralized with degassed methanol, and the product was fractionated by the toluene/methanol system. The fractionated G-3 dendritic copolymer was precipitated into an excess of methanol and dried under vacuum, until constant weight. The molecular characterization results are given in Table 6.

TABLE 6

| Sample | $M_w^b$ Arm (G-3) (kg/mol) | $M_w^b$ Arm (G-2) (kg/mol) | $M_w^b$ Arm (G-1) (kg/mol) | $M_w^c$ Dendrite (kg/mol) | $M_w^b$ Dendrite (kg/mol) | $(M_w/M_n)^a$ dendrite | Weight (g) |
|---|---|---|---|---|---|---|---|
| 7 | 4.79 | 11.12 | 8.17 | 148.80 | 148.86 | 1.09 | 0.5 |
| 8 | 4.68 | 5.81 | 5.36 | 107.10 | Klasm | | |
| 9 | 7.66 | 7.71 | 24.38 | 211.32 | 202.35 | 1.09 | 1 |
| 10 | 13.81 | 15.01 | 1.05 | 258.93 | 222.01 | 1.12 | |
| 11 | 13.81 | 18.06 | | | | | |

$^a$SEC in THF at 30° C., using PBd standards.
$^b$Obtained by SEC-TALLS in THF at
$^c$Calculated from the molecular weights of the arms.

What is claimed is:

1. A convergent method for anionically synthesizing a highly branched well-defined $1^{st}$ generation polydiene comprising the following steps:
    reacting a diene monomer (d) with sec-diene-Li to form a single double-tailed macromonomer of $(Pdd_1)^-Li^+$,
    coupling two of said single double-tailed macromonomers of $(Pdd_1)^-Li^+$ together in a convergent manner by reacting with dichloro methyl silane diphenylethylene (DCMSDPE) coupling agent to form a double macromonomer of polydiene with a middle active center,
    reacting said double macromonomer of polydiene with said diene monomer and sec-diene-Li at said middle active center to form a $1^{st}$ generation-diene-lithium branch on branch structure, and
    combining three or more of said $1^{st}$ generation-diene-lithium branch on branch structures by reacting with trichloro silane coupling agent to form highly branched well-defined $1^{st}$ generation polydiene.

2. The convergent method of claim 1 wherein said diene monomer is selected from the group consisting of butadiene, isoprene, 2-methyl-1,3-pentadiene, 2-ethyl-1,3-pentadiene, 2-propyl-1,3-pentadiene, 2-butyl-1,3-pentadiene, 2-pentyl-1,3-pentadiene, 2-hexyl-1,3-pentadiene, 2-ethyl-1,3-butadiene, 2-propyl-1,3-butadiene, 2-butyl-1,3-butadiene, 2-pentyl-1,3-butadiene, 2-hexyl-1,3-butadiene, 2,3-dimethyl-1,3-butadiene, 2,3-diethyl-1,3-butadiene, 2,3-dipropyl-1,3-butadiene, 2,3-dibutyl-1,3-butadiene, 2,3-dipentyl-1,3-butadiene, 2,3-dihexyl-1,3-butadiene, myrcene (7-methyl-3-methylene-1,6-octadiene) and 1,3-cyclohexadiene.

3. The convergent method of claim 2 further comprising a step of hydrogenating said highly branched well-defined $1^{st}$ generation polydiene formed from said butadiene monomer to form a highly branched well-defined $1^{st}$ generation polyethylene.

4. The convergent method of claim 2 further comprising the step of hydrogenating said highly branched well-defined $1^{st}$ generation polydiene formed from said isoprene monomer to form a highly branched well-defined $1^{st}$ generation ethylene-propylene copolymer.

5. The convergent method of claim 2 further comprising the step of hydrogenating said highly branched well-defined $1^{st}$ generation polydiene formed from said 2-methyl-1,3-pentadiene monomer to form a highly branched well-defined $1^{st}$ generation atactic polypropylene.

6. A convergent method for anionically synthesizing a highly branched well-defined 2nd generation polydiene comprising the following steps:
    reacting diene monomer (d) with sec-diene-Li to form a single double-tailed macromonomer of $(Pdd_1)^-Li^+$,
    coupling two of said single double-tailed macromonomers of $(Pdd_1)^-Li^+$ together in a convergent manner by reacting with dichloro methyl silane diphenylethylene (DCMSDPE) coupling agent to form a double macromonomer of polydiene with a middle active center,
    reacting said double macromonomer of polydiene with said diene monomer and sec-diene-Li at the middle active center to form a $1^{st}$ generation-diene-lithium branch on branch structure, and
    reacting said $1^{st}$ generation-diene-lithium branch on branch structures with DCMCDPE coupling agent followed by the further addition of said single double-tailed macromonomer of $(Pdd_1)^-Li^+$ to form a highly branched well-defined 2nd generation polydiene.

7. The convergent method of claim 6 wherein said diene monomer is selected from the group consisting of butadiene, isoprene, 2-methyl-1,3-pentadiene, 2-ethyl-1,3-pentadiene, 2-propyl-1,3-pentadiene, 2-butyl-1,3-pentadiene, 2-pentyl-1,3-pentadiene, 2-hexyl-1,3-pentadiene, 2-ethyl-1,3-butadiene, 2-propyl-1,3-butadiene, 2-butyl-1,3-butadiene, 2-pentyl-1,3-butadiene, 2-hexyl-1,3-butadiene, 2,3-dimethyl-1,3-butadiene, 2,3-diethyl-1,3-butadiene, 2,3-dipropyl-1,3-butadiene, 2,3-dibutyl-1,3-butadiene, 2,3-dipentyl-1,3-butadiene, 2,3-dihexyl-1,3-butadiene, myrcene (7-methyl-3-methylene-1,6-octadiene) and 1,3-cyclohexadiene.

8. The convergent method of claim 7 further comprising the step of hydrogenating said highly branched well-defined $2^{nd}$ generation polydiene formed from said butadiene monomer to form a highly branched well-defined 2nd generation polyethylene.

9. The convergent method of claim 7 further comprising the step of hydrogenating said highly branched well-defined $2^{nd}$ generation polydiene formed from said isoprene monomer to form a highly branched well-defined 2nd generation ethylene-propylene copolymer.

10. The convergent method of claim 7 further comprising the step of hydrogenating said highly branched well-defined 2nd generation polydiene formed from said 2-methyl-1,3-pentadiene monomer to form a highly branched well-defined $2^{nd}$ generation atactic polypropylene.

* * * * *